(12) United States Patent
Junker

(10) Patent No.: US 10,318,975 B2
(45) Date of Patent: Jun. 11, 2019

(54) IDENTIFYING A CASE WITH A MISSING DECISION FROM A SET OF DECISION RULES IN VIOLATION OF A DECISION REQUIREMENT

(71) Applicant: INTERNATIONAL BUSINESS MACHINES CORPORATION, Armonk, NY (US)

(72) Inventor: Ulrich M. Junker, Valbonne (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 882 days.

(21) Appl. No.: 14/938,160

(22) Filed: Nov. 11, 2015

(65) Prior Publication Data

US 2017/0132522 A1    May 11, 2017

(51) Int. Cl.
*G06Q 30/02*       (2012.01)
*G06N 5/02*        (2006.01)

(52) U.S. Cl.
CPC ......... *G06Q 30/0207* (2013.01); *G06N 5/025* (2013.01)

(58) Field of Classification Search
CPC ......... G06N 5/025; G06N 5/047; G06N 5/045
See application file for complete search history.

(56) References Cited

U.S. PATENT DOCUMENTS

| | | | | |
|---|---|---|---|---|
| 8,676,737 B2* | 3/2014 | Junker | ................ | G06N 7/005 706/47 |
| 8,909,584 B2* | 12/2014 | Junker | ................ | G06N 5/025 706/47 |
| 9,031,893 B2* | 5/2015 | Ziegler | ................ | G06N 5/025 706/47 |
| 2012/0158628 A1* | 6/2012 | Junker | ................ | G06F 19/00 706/14 |
| 2014/0164311 A1* | 6/2014 | Junker | ................ | G06N 5/025 706/47 |
| 2014/0249875 A1* | 9/2014 | Junker | ................ | G06Q 10/06 705/7.11 |

(Continued)

OTHER PUBLICATIONS

Rosca et al., "A decision making methodology in support of the business rules lifecycle" Dept. of Comput. Sci., Old Dominion Univ, Norfolk, VA; Abstract; Jan. 6-10, 1997; 3 pgs.

(Continued)

*Primary Examiner* — Paulinho E Smith
(74) *Attorney, Agent, or Firm* — Cantor Colburn LLP; Richard Wilhelm

(57) ABSTRACT

Methods for identifying a case with a missing decision from a set of decision rules in violation of a decision requirement are provided. The set of decision rules and decision requirement are received, and a set of decisions made by the decision rules is obtained. A decision detection constraint graph is built, which represents, for each case used by the set of decision rules, whether each decision in the set of decisions is made or not by a decision rule in the set of decision rules. A decision requirement constraint graph is built from the decision requirement, which represents, for each case used by the set of decision rules, the decisions required. For each case used by the set of decision rules, the decision requirement constraint graph and the decision detection constraint graph for the case are used to identify if the case is a case with a missing decision.

17 Claims, 20 Drawing Sheets

(56) References Cited

U.S. PATENT DOCUMENTS

2017/0132522 A1\* 5/2017 Junker .............. G06Q 30/0207
2017/0140281 A1\* 5/2017 Hillion .................. G06N 5/045

OTHER PUBLICATIONS

Spreeuwenberg et al., "Requirments for Successful Verification in Practice", FLAIRS—02 Proceedings. Copyright 2002, AAAI (www.aaai.org), pp. 221-225.

\* cited by examiner

IDENTIFYING A CASE WITH A MISSING DECISION FROM A SET OF DECISION RULES IN VIOLATION OF A DECISION REQUIREMENT

BACKGROUND

The present invention relates to identifying a case with a missing decision from a set of decision rules in violation of a decision requirement.

SUMMARY

Embodiments include methods, systems and computer program products for identifying a case with a missing decision from a set of decision rules in violation of a decision requirement, wherein the decision rules determine whether a decision is made for a case, and wherein the decision requirement determines the decisions required for a case. Aspects include receiving the set of decision rules, receiving the decision requirement, and obtaining a set of decisions made by the decision rules. Aspects also include building a decision detection constraint graph that represents, for each case used by the set of decision rules, whether each decision in the set of decisions is made or not for the case by a decision rule in the set of decision rules, building a decision requirement constraint graph from the decision requirement, that represents for each case used by the set of decision rules the decisions required for that case and for each case used by the set of decision rules, using the decision requirement constraint graph and the decision detection constraint graph for the case to identify if the case is a case with a missing decision.

It will of course be appreciated that features described in relation to one aspect of the present invention may be incorporated into other aspects of the present invention. For example, the method of the invention may incorporate any of the features described with reference to the computer system of the invention and vice versa.

BRIEF DESCRIPTION OF THE DRAWINGS

Exemplary embodiments of the present invention will now be described, by way of example only, with reference to the following drawings in which:

FIG. 4b is a data-flow chart showing the operation of the scope completer of FIG. 4a;

DETAILED DESCRIPTION

Figure 1:
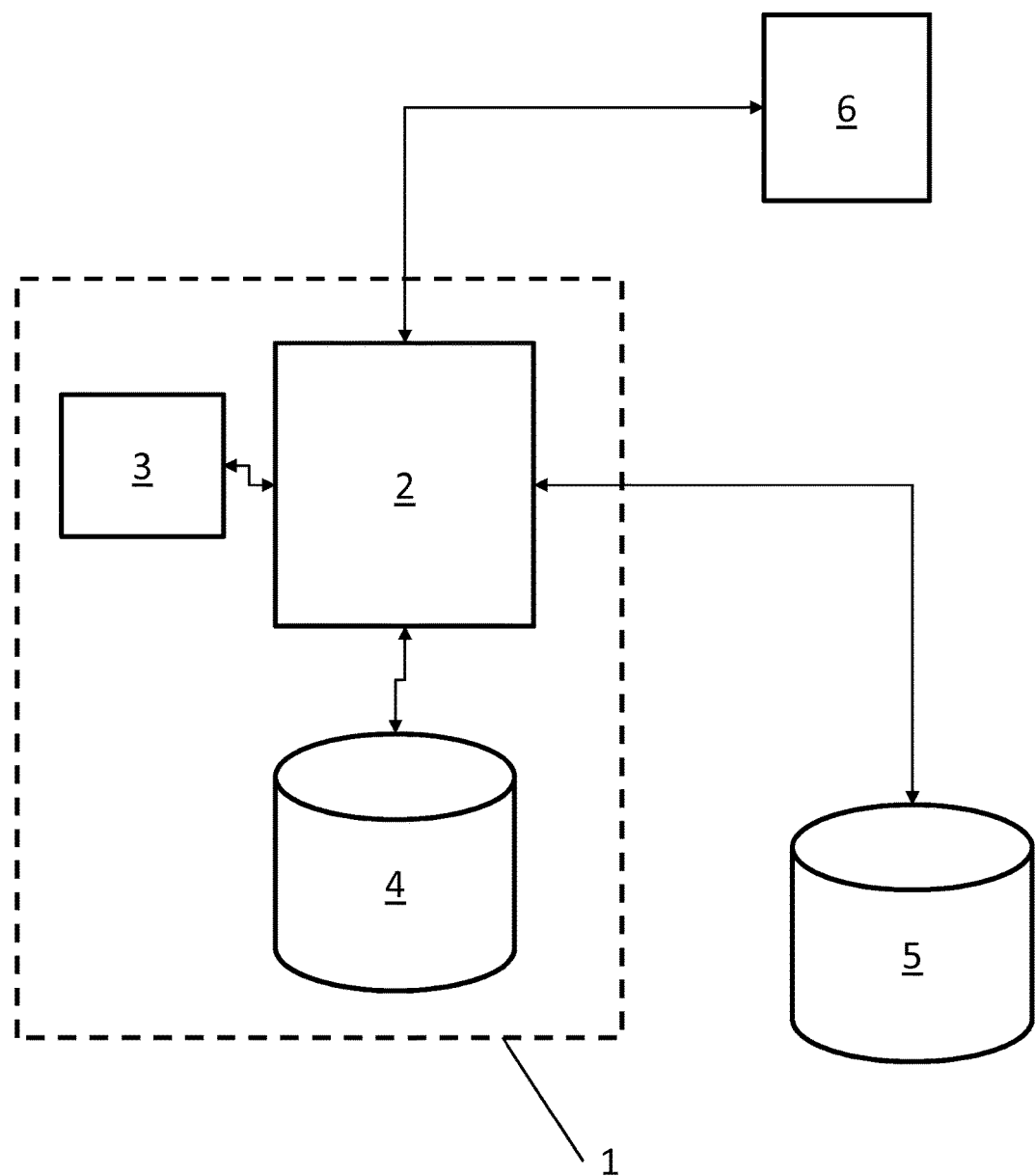
FIG. 1 is a schematic diagram of system comprising a computer system in accordance with an embodiment of the invention.

FIG. 1 shows a computer system in accordance with an embodiment of the invention. The computer system 1 shown in FIG. 1 is a server system, comprising a processor system 2, and volatile random-access memory 3 in communication with the processor system 2. It will be appreciated that in different embodiments of the invention the processor system may comprise a single processor, multiple processors, and may be solely for the use of the computer system 1 or shared with other computer systems in a "virtual" environment, for example. Similarly, in different embodiments the memory 3 may be a single memory area or comprises multiple separate memory areas, and may be shared with other computer systems. In some embodiments, in addition to the memory 3 the processor system 2 will have its own internal cache memory.

The computer system 1 further comprises a persistent memory 4 in communication with the processor system 2, which may be a hard disk or the like. The computer system 1, and the processor system 2 thereof in particular, is also in communication with an external persistent memory 5. In different embodiments the external persistent memory 5 may be local to the computer system 1 or in a remote location, and may be directly connected to the computer system 1, connected via a local area network or via a non-local network such as the Internet, for example.

The computer system 1 is in communication with a remote computer device 6, which may for example another server or a personal computer (PC). As discussed below, the rules etc. processed by the computer system 1 in accordance with embodiments of the invention are sent to the computer system 1 by the remote computer device 6.

Figure 2:
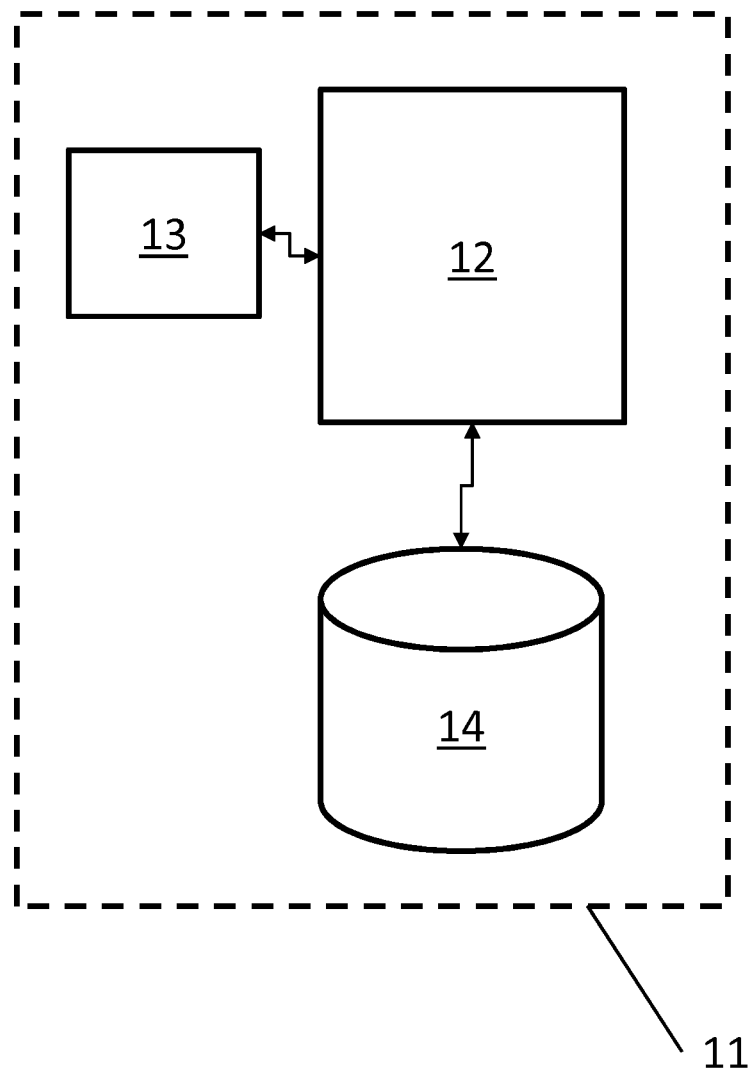
FIG. 2 is a schematic diagram of system comprising a computer system in accordance with another embodiment of the invention.

FIG. 2 shows a computer system in accordance with another embodiment of the invention. In this embodiment, the computer system 11 is a PC, comprising a processor system 12 in communication with random-access memory 13 and persistent memory 14. In this embodiment, the rules etc. processed by the computer system 1 in accordance with embodiments of the invention are provided on the computer system 11 itself, for example because the computer system 1 is itself operating using the rules that are being analysed. On other embodiments, the rules may be directly entered by a user using an input device (e.g. keyboard, etc.), downloaded from a remote location over a network, or obtained from a removable memory device such as a USB memory stick, for example.

An example to illustrate certain principles of the operation of certain embodiments of the invention is now described with reference to FIGS. 3a to 3e. In this example, a set of rules that is used by a web shopping system operated by the remote computer device 6 is analysed by the computer system 1. It will be appreciated that the following is an example only, provided to allow an explanation of various different aspects that may be taken into account by different embodiments of the invention, and that not all embodiments of the invention need take into account all of the discussed aspects.

As discussed in more detail below, the rules make decisions based on the attributes of objects. The set of rules is referred to herein as a "decision policy". In the present example the objects are shopping carts and the items they contain, such as cameras, accessories and the like. The attributes of the objects are for example, for cameras, accessories and the like, the colours of the items. The decision policy determines which decisions will be made for which cases. Both cases and decisions may have complex forms. Case descriptions may involve multiple objects of different types and specify the values of the attributes of those objects. Decisions may be composite (i.e. divisible into separable parts) and consist of multiple atomic decisions (i.e. decision that are not divisible into separate parts) such as pricing and attribution of fidelity points for a shopping cart (e.g. points given to a customer as a reward for purchasing items). Decision policies with composite decisions will herein be called "composite decision policies".

Each atomic decision has a set of alternative actions, and making the decision involves applying one of these actions to the case. For example, the pricing decision may be made for an object of type 'ShoppingCart' by assigning a numeric value to an attribute named 'price' of this object. The fidelity points may be attributed by calling one of the methods 'giveFivePoints', 'giveTenPoints', or 'giveTwentyPoints' of the shopping cart object. Each atomic decision thus has a decision definition that defines the alternative actions of the decision.

Certain decision policies may require that each of their atomic decisions are made, meaning that the decision of such a policy is made by composite actions which consist of one of the alternative actions for each of the atomic decisions. Other decision policies may require that certain atomic decisions are made dependent on other actions or decisions. The composite actions of those policies have a more heterogeneous structure and consist of a set of atomic actions that satisfy policy-dependent constraints. These constraints on the set of atomic actions are herein called "decision requirements". The set of alternative actions of a composite decision can thus be characterised by a set of decision definitions and decision requirements.

An example for a composite decision policy with heterogeneous structure is obtained by pricing problems that involve bundling. A customer may have established a shopping cart consisting of a list of items to buy. Items may be priced individually or as part of a bundle. A bundle is a collection of items, and proposes a particular pricing for this collection, which is (or should be) smaller than the sum of the individual prices of the items in the bundle. A bundle is eligible for a shopping cart if the shopping cart contains all the items of the bundle and other conditions are met. The pricing problem involves determining eligible bundles of the shopping cart, and determining prices for them. This is addressed by a composite policy that proposes multiple bundles for a shopping cart and determines prices for those bundles.

The composite decision policy needed for the pricing problem involves three kinds of atomic decisions. The first kind of decision is applied to given items and involves proposing or forbidding a bundle for these items. This decision is generic in nature, and its scope consists of the items and the shopping cart. Similarly, the second kind of decisions is applied to given items and involves pricing these items as a bundle. Such a pricing decision needs only be made for given items if a bundle is proposed for these items. The third kind of decision involves determining whether to offer or to deny a voucher for the shopping cart. Its scope consists only of the shopping cart.

The definition of the voucher decision specifies the name, the scope, and the actions of the decision. The scope description indicates the type of the single object in the scope which is 'shopping cart', and introduces a variable name for it. The action description lists each possible action while using the variable names to refer to the objects that are subject of the action. For example, the decision definition may be given in the following form:
decision Voucher
   set s to a shopping cart;
actions:
   a voucher is offered for s
   a voucher is denied for s In the present example, bundling decisions can be made for a camera and a proprietary accessory, as well as for a third-party accessory and an adapter. Both bundling decisions need to be defined. The first bundling decision has three objects in its scope, namely a shopping cart, a camera, and a proprietary accessory. The definition of the bundling decision indicates the types of these three objects and introduces a variable name for each of them. The action description lists the two alternative bundling actions for a shopping cart, a camera, and a proprietary accessory:
decision Bundling
   set s to a shopping cart;
   set c to a camera;
   set o to a proprietary accessory;
actions:
   the bundle {c, o} is proposed for s
   the bundle {c, o} is forbidden for s The second bundling decision is similar to the first one, but has a different scope which consists of a shopping cart, a third-part accessory, and an adapter: decision Bundling
   set t to a shopping cart;
   set s to a third-party accessory;
   set a to an adapter;
actions:
   the bundle {t, a} is proposed for s
   the bundle {t, a} is forbidden for s Pricing decisions will be made for the same objects as for the bundling decisions. Hence, there are two pricing decisions having the same scopes as the respective bundling decisions. The pricing actions are described in an intensional form by using an additional variable y that represents any number. The pricing decision for a camera and a proprietary accessory thus has a single action declaration, but this action declaration describes multiple pricing actions, namely one for each possible value of the pricing variable:
decision Pricing
   set s to a shopping cart;
   set c to a camera;
   set o to a proprietary accessory;
actions:
   the bundle {c, o} is priced at y for s where y is a number The pricing decision for a third-party accessory and an adapter is defined in a similar way:
decision Pricing
   set s to a shopping cart;
   set t to a third-party accessory;
   set a to an adapter;
actions:
   the bundle {t, a} is priced at y for s where y is a number Each atomic decision thus has a decision definition which specifies the alternative atomic actions for this atomic decision. The composite decision of the considered policy has composite actions which are combinations of the atomic actions. Each composite action needs to contain at least one atomic action. Moreover, if a composite action proposes a bundle for a shopping cart and given items, then it also needs to price these items for the given shopping cart. Hence, the pricing decision needs to be made if the action of proposing a bundle is applied. Such a decision requirement thus has the form of a logical implication between items being proposed as a bundle for a shopping cart and a pricing decision being made for the items. A first decision requirement specifies that a pricing decision needs to be made if a bundle consisting of a camera and proprietary accessory is proposed:

for all shopping carts s, camera c, and proprietary accessories o:
    if the bundle {c, o} is proposed for s then the pricing decision is made for s and {c, o}

A second decision requirement specifies that a pricing decision needs to be made if a bundle consisting of a third-party accessory and an adapter is proposed: for all shopping carts s, third-party accessories t, and adapters a:
    if the bundle {t, a} is proposed for s then the pricing decision is made for s and {t, a}

These decision requirements are universally quantified as they hold for all shopping carts and all items of specified types. For example, the first requirement can be applied to a shopping cart S1, a camera C1, and a proprietary accessory O1. The condition "the bundle C1,O1 is proposed for S1" is satisfied by a set of atomic actions if this set contains the action "the bundle C1,O1 is proposed for S1". However, if the set of actions does not contain this action, then this condition evaluates to false for this set of actions.

As the decision requirement imposes that pricing decisions are made in certain circumstances, it is necessary to define when those decisions are made. According to the definition of the pricing decision, this decision is made if a pricing action is applied for some number. This can be expressed by quantified constraints:

for all shopping carts s cameras c, and proprietary accessories o:
    the pricing decision is made for s and {c, o} iff there exists a number p such that the bundle {c, o} is priced at p for s for all shopping carts s, third-party accessories t, and adapters a:
    the pricing decision is made for s and {t, a} iff there exists a number p such that the bundle {t, a} is priced at p for s Other decision requirements might impose a bundling or voucher decision. For example, the following quantified constraint detects that a bundling decision is made for a shopping cart and items if and only if the items are proposed as a bundle for the shopping cart or the items are forbidden as a bundle for the shopping cart:

for all shopping carts s, cameras c, and proprietary accessories o:
    the bundle decision is made for s and {c, o} iff the bundle c, o is proposed for s or the bundle {c, o} is forbidden for s for all shopping carts s, third-party accessories t, and adapters a:
    the bundle decision is made for s and {t, a} iff the bundle {t, a} is proposed for s or the bundle {t, a} is forbidden for s The composite decision of the considered policy can thus be made by any composite action that consists of at least one atomic action and that satisfies the decision requirement constraint and the constraints detecting whether decisions have been made.

It will be appreciated that decision requirements can be arbitrary logical implications formulated over the atomic actions that are applied to a case as well as over the atomic decisions made for the case. The decision requirement given above is a logical implication stating that a decision is made if an action (of some other decision) has been applied. Other requirements may express other forms of constraints. For example, a dependency between two decisions can be formulated by an implication stating that a second decision is made if a first decision is made. The requirement of making two decisions for all cases can be expressed by two implications with antecedent "true" stating that the first decision is made and that the second decision is made.

As composite decisions have actions of complex form, it is often not immediately apparent whether a given composite decision policy maps the cases to composite actions that satisfy the decision requirements. This problem can be illustrated by an example for a composite decision policy. FIGS. 3a to 3e are diagrams representing the decisions of a decision policy for the bundling, pricing, and voucher decisions considered above. The figures show the decisions for the same decision policy, but for cases of different scope. Each scope consists of objects of different types. For example, the scope of FIG. 3a consists of a camera C1, a third-party accessory T1, and a proprietary accessory O1. The scope of FIG. 3b consists of only the camera C1 and the accessory O1, but not of the third-party accessory T1. These objects have different attributes, in particular including a colour attribute that has the possible values white (W), silver (S), and black (B). For example, the colour of camera C1 and the colour of accessory O1 influence bundling, pricing, and voucher decisions. Each case of the scopes of FIGS. 3a and 3b assigns one of the three colour values to the colour attributes of these two objects. These colour values are depicted as axes in the figures, with the cases correspond to positions with respect to the axes. For example, a case consisting of a white camera C1 and a white proprietary accessory O1 corresponds to the lower left position with respect to the two axes.

Figure 3A:
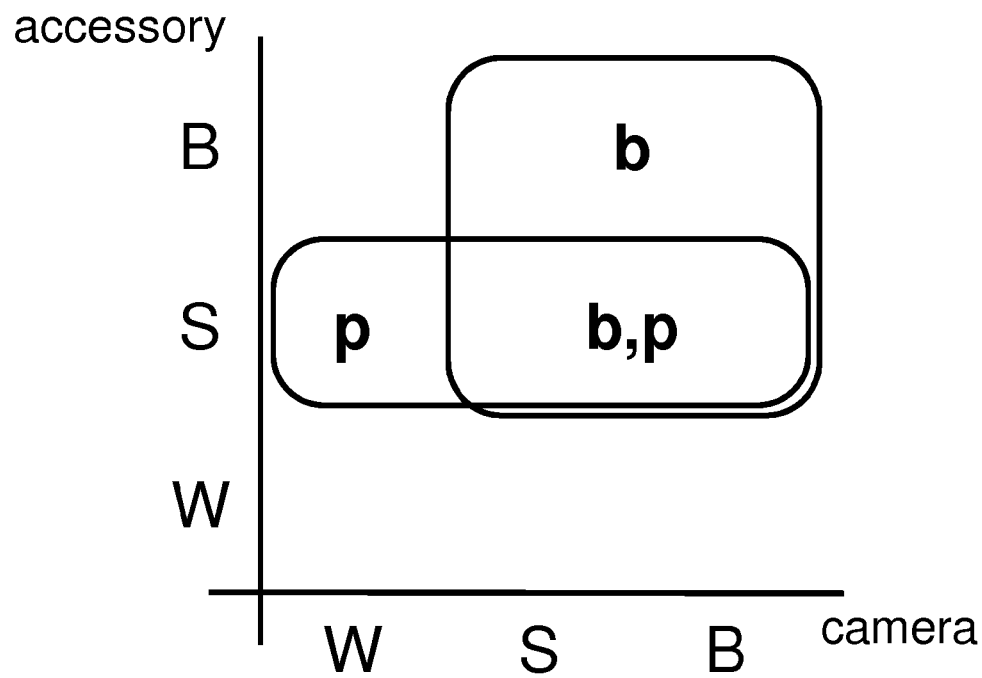
FIGS. 3a, 3b, 3c, 3d and 3e are diagrams illustrating decisions made by an example rule set for different scopes.
Figure 3B:
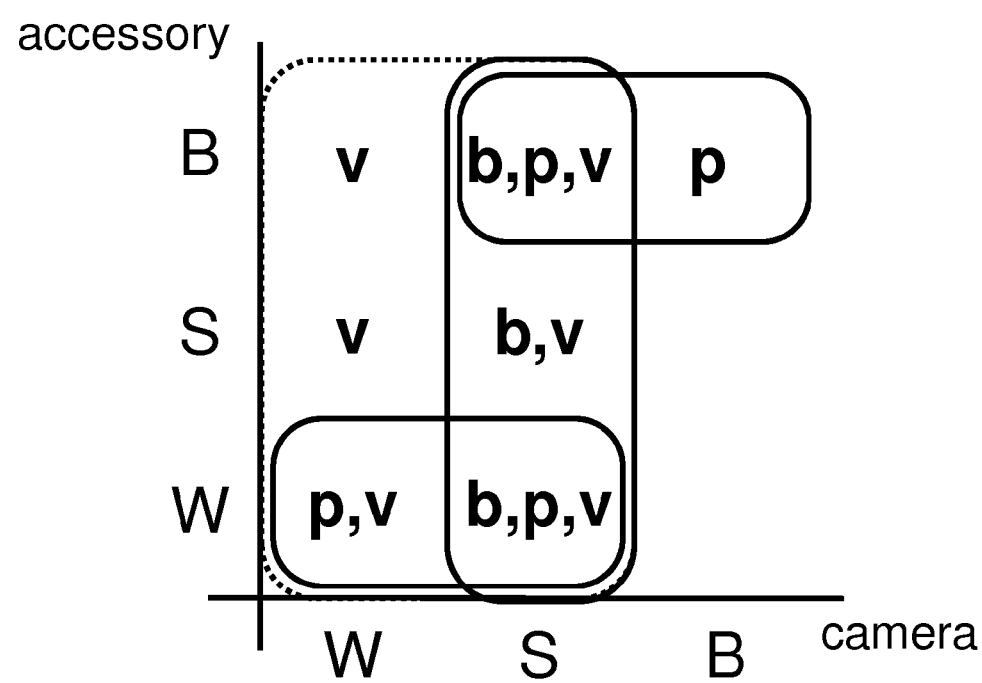

The composite decision policy maps the cases to different atomic decisions depending on the values of the colour attributes. For example, a case consisting of a white camera and a white proprietary accessory is subject of pricing and voucher decisions as indicated in FIG. 3b. Another case may consist of a black camera and a black proprietary accessory. According to the same figure, it is subject of a pricing decision, but not of a bundling or voucher decision. However, a case that consists of a black camera, a black proprietary accessory, and an additional third-party accessory is subject of a bundling decision as indicated in FIG. 3a.

Figure 3C:
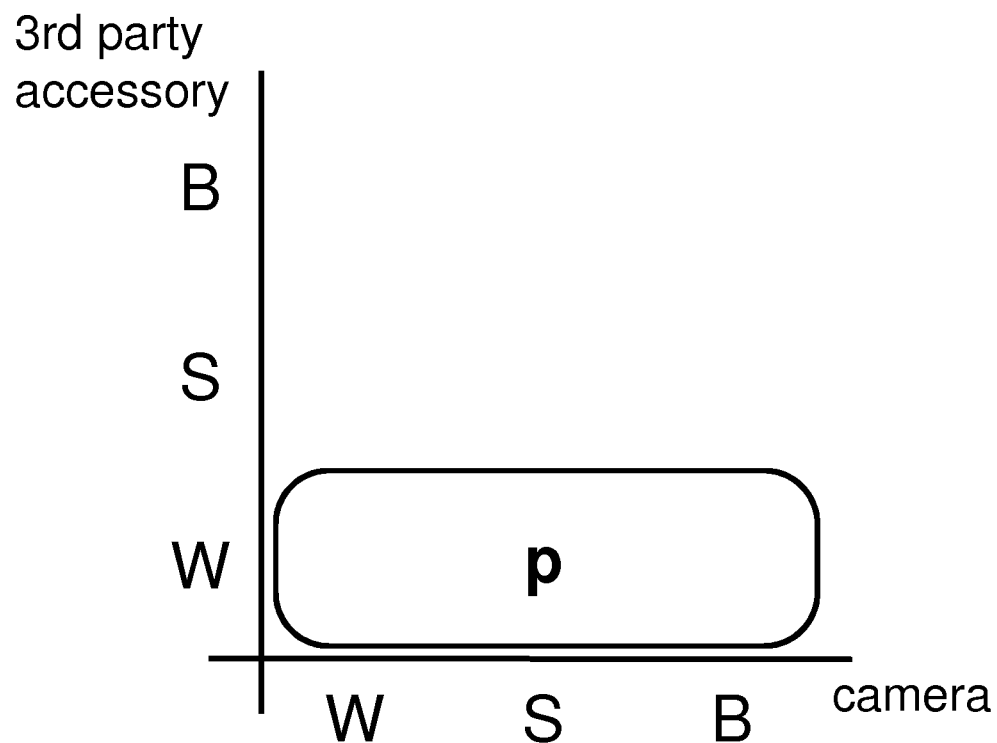
Figure 3D:
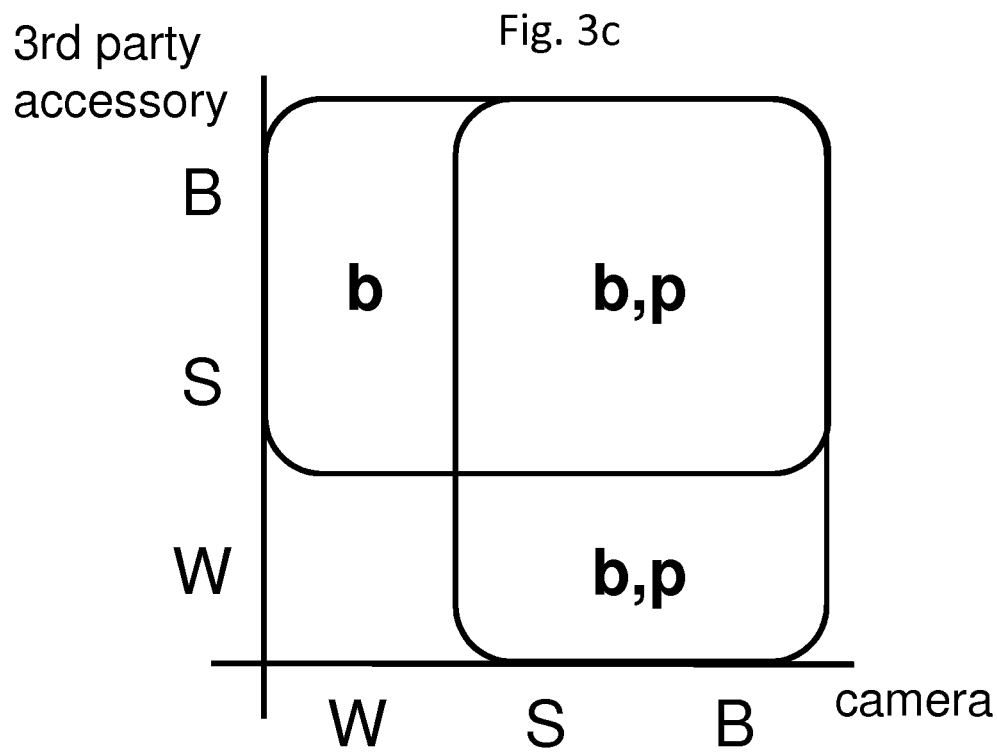
Figure 3E:
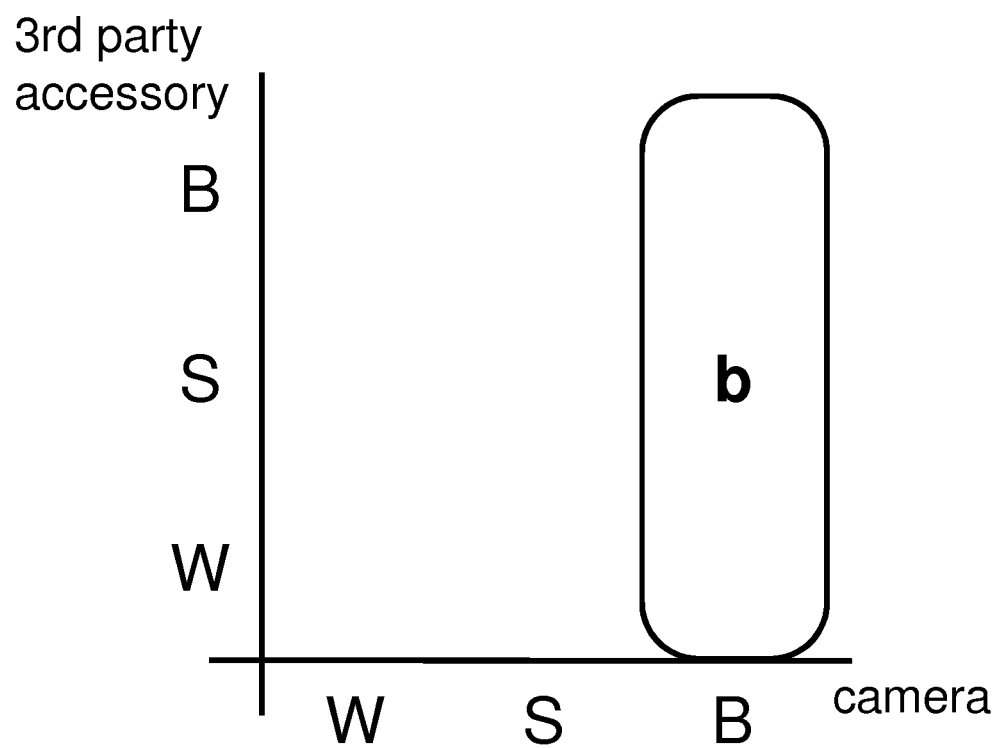

FIGS. 3c to 3e represent the decision policy for cases with further alternative scopes. The scope of FIG. 3c consists of a third-party accessory T1 and an adapter A1 that allows the accessory to be connected to the considered camera system. The scope of FIG. 3d consists of the camera C1, the third-party accessory T1, and the adapter A1. The scope of FIG. 3e consists of the camera C1, the third-party accessory T1, the proprietary accessory O1, and the adapter A1. The scope of FIG. 3d thus consists of all objects included in the scopes FIGS. 3a to 3d. The diagrams of FIGS. 3c to 3e show the values of the colour attributes of the camera C1 and the third-party accessory T1. As the camera C1 is not included in scope of FIG. 3c, the colour attribute of C1 is not available for cases in the scope of FIG. 3c, meaning that the x-axis of the diagram of FIG. 3c is not in fact relevant. It is nevertheless included in the figure in order to keep the overall presentation consistent.

In order to determine whether a composite decision policy maps cases to valid actions, it is necessary to represent this policy. Decision policies involving these complex forms of decisions and cases can be represented compactly in form of a set of rules formulated in a suitable formal rule language. Each rule is applicable to a subset of the cases, namely those that satisfy the rule condition. When a rule is applied to a case, it applies one or more actions to these cases. A rule makes an atomic decision if one of its actions belongs to the set of alternative actions of this decision. Usually, a single rule will not be sufficient to make all decisions for all cases. Multiple rules will be needed to ensure that each case is treated by some rule and that all required decisions are made. When applying a rule set to a case, all rules that are applicable to the case should be applied to the case. However, if some of those rules have conflicting actions, then rules may conflict. To allow for this, rules can be given a priority level, and in the case of conflict rules of lower priority are not applied. It will be appreciated that various other methods of choosing between conflicting decisions could be used. Applying a set of rules to a case thus results in a set of atomic actions. A rule set represents a composite decision policy if the decision policy maps each case to a composite action which consists of the atomic actions obtained by applying the rule set to this case.

For example, the composite decision policy shown in FIGS. 3a to 3e can be represented by the ten following rules.

Rule b1 of priority 1:
definitions
  set 'SC1' to a shopping cart;
  set 'Camera1' to a camera in the items of SC1;
  set 'Accessory1' to a proprietary accessory in the items of SC1;
if the colour of Camera1 is "Silver"
then the bundle {Camera1, Accessory1} is proposed for SC1;

Rule b2 of priority 2:
definitions
  set 'SC1' to a shopping cart;
  set 'Camera1' to a camera in the items of SC1;
  set 'Accessory1' to a third party accessory in the items of SC1;
  set 'Adapter1' to an adapter in the items of SC1;
if the colour of Accessory1 is not "White"
then the bundle {Adapter1, Accessory1} is proposed for SC1;

Rule b3 of priority 3:
definitions
  set 'SC1' to a shopping cart;
  set 'Camera1' to a camera in the items of SC1;
  set 'Adapter1' to an adapter in the items of SC1;
  set 'Accessory1' to a proprietary accessory in the items of SC1;
  set 'Accessory2' to a third party accessory in the items of SC1;
if the colour of Camera1 is "Black"
then the bundle {Adapter1, Accessory2} is forbidden for SC1;

Rule b4 of priority 2:
definitions
  set 'SC1' to a shopping cart;
  set 'Camera1' to a camera in the items of SC1;
  set 'Accessory1' to a third party accessory in the items of SC1;
  set 'Accessory2' to a proprietary accessory in the items of SC1;
if the colour of Camera1 is not "White" and the colour of Accessory2 is not "White"
then the bundle {Camera1, Accessory2} is proposed for SC1;

Rule p1 of priority 1:
definitions
  set 'SC1' to a shopping cart;
  set 'Camera1' to a camera in the items of SC1;
  set 'Accessory1' to a proprietary accessory in the items of SC1;
if the colour of Accessory1 is "White" and the colour of Camera1 is not "Black"
then the bundle {Camera1, Accessory1} is priced at 500 for SC1;

Rule p2 of priority 1:
definitions
  set 'SC1' to a shopping cart;
  set 'Camera1' to a camera in the items of SC1;
  set 'Accessory1' to a proprietary accessory in the items of SC1;
if the colour of Camera1 is not "White" and the colour of Accessory1 is "Black"
then the bundle {Camera1, Accessory1} is priced at 500 for SC1;

Rule p3 of priority 1:
definitions
  set 'SC1' to a shopping cart;
  set 'Adapter1' to an adapter in the items of SC1;
  set 'Accessory1' to a third party accessory in the items of SC1;
if the colour of Accessory1 is "White"
then the bundle {Adapter1, Accessory1} is priced at 500 for SC1;

Rule p4 of priority 2:
definitions
  set 'SC1' to a shopping cart;
  set 'Camera1' to a camera in the items of SC1;
  set 'Accessory1' to a third party accessory in the items of SC1;
  set 'Accessory2' to a proprietary accessory in the items of SC1;
if the colour of Accessory2 is "Silver"
then the bundle {Camera1, Accessory2} is priced at 450 for SC1;

Rule r1 of priority 2:
definitions
  set 'SC1' to a shopping cart;
  set 'Camera1' to a camera in the items of SC1;
  set 'Adapter1' to an adapter in the items of SC1;
  set 'Accessory1' to a third party accessory in the items of SC1;
if the colour of Camera1 is not "White"
then the bundle {Adapter1, Accessory1} is proposed for SC1;
  the bundle {Adapter1, Accessory1} is priced at 400 for SC1;

Rule v1 of priority 1:
definitions
  set 'SC1' to a shopping cart;
  set 'Camera1' to a camera in the items of SC1;
  set 'Accessory1' to a proprietary accessory in the items of SC1;
if the colour of Camera1 is not "Black"
then a voucher is offered for SC1;

It will be appreciated that the same decision policy can be represented by different rule sets differing in the forms of conditions and forms of actions. Most rules of the rule set given above are applying a single atomic action. The only exception is rule r1, which has two atomic actions. The separation of atomic actions by using different rules for each action has the advantage that the separate rules can be applied independently of each other. If a rule has several atomic actions and one of these actions conflicts with that of a rule of higher priority, the first rule will not be applied. This will result in none of the actions of the first rule being applied, including the actions that do not lead to any conflict.

While the rule set given above describes the policy in a formal manner, it cannot easily be used to determine whether the decision policy respects the decision requirements. In particular, it is not easily apparent which cases are mapped to some, but not all required atomic actions. For example, there may be cases that are mapped to a bundling and a voucher decision, but not a pricing decision. A manual examination of the rules does not easily reveal those missing decisions. There may be rules such as rules b1, b2, b3, b4 that apply a bundling, but no pricing decision to certain cases. However, there may be other rules that apply the missing pricing decisions to the cases. The cases that are treated by those rules are characterised by logical conditions, meaning that logical reasoning and constraint satisfaction techniques are necessary to identify cases that are subject of a bundling decision, but not of a pricing decision. Other decision requirements may impose other constraints on the decisions to be made and thus require that other kinds of relationships between conditions on cases need to be considered. Given a set of rules, constraint satisfaction capabilities are necessary to identify cases with missing decisions.

It will be appreciated that such a constraint-based identification of cases with missing decisions may need to take several scenarios into account. (However, it will also be appreciated that there will be embodiments of the invention that do not take all of the scenarios into account.) A first scenario is shown in FIG. 3c, in which the scope consists of a third-party accessory and an adapter. There is one rule, namely p3, which matches all objects in this scope. If the third-party accessory is white, then this rule makes a pricing decision for a bundle consisting of the third-party accessory and the adapter, but not a bundling or voucher decision. Hence, some decisions are not made for such a case, but this does not matter as those decisions are not required. Such a scenario does not correspond to a case with missing decisions.

A second scenario is shown in FIGS. 3a and 3b. In FIG. 3a, the scope consists of a camera, a proprietary accessory, and a third-party accessory. There are two rules, namely b4 and p4, which match all objects in this scope. If the camera and the proprietary accessory are black, then the rules propose a bundle consisting of the camera and the proprietary accessory. As such a bundle proposal also requires a pricing decision, but no pricing decision is made by rules b4 and p4, this scenario seems to reveal a case with missing decisions. However, the rule p2, which has a scope consisting of a camera and a proprietary accessory, is also applicable to such a case. As p2 makes a pricing decision for this case, this case does not have a missing decision. This pricing decision is shown in FIG. 3b, in which the scope consists of a camera and a proprietary accessory. Hence, as can be seen, decisions may apparently be missing when considering a certain scope, but the missing decisions may be provided by a sub-scope of the considered scope.

While the scope of FIG. 3b provides the missing pricing decision for the scope of FIG. 3a, it has a case with a missing decision itself. There are four rules, namely b1, p1, p2, v1, which match all objects in the scope of FIG. 3b. If the camera and the proprietary accessory are silver, then the rules propose a bundle consisting of these two items, but do not determine a price for this bundle. As a bundle proposal requires a pricing decision, this decision requirement is not fulfilled by this case. As there are no rules of smaller scope, this missing decision is not provided by any sub-scope. Hence, this case is a case with a missing decision.

Once such a case is identified, a rule that makes a decision for this case can be generated. In order to build this rule, one of the alternative possible actions of the decision needs to be chosen. This can be achieved by querying a domain expert or an external analytic system that is able to determine suitable rules by analysing existing data, for example. Once an appropriate action for the rule has been determined, the new rule can be built and added to the rule set. The extended rule set may contain other cases with missing decisions which can be determined, by iterating the whole method. It can be seen that further cases with missing decisions can be determined for the extended rule set, even if the action has not yet been chosen for the case with missing decisions. To allow this, a "ghost decision" can be used when building the rule. The ghost decision indicates the type of decision that will be made by the rule, but does not specify which of the alternative actions will be chosen. Instead, a placeholder is used, which can be replaced subsequently when the required action is chosen. For example, the following rule treats the case with missing pricing decision in the scope of FIG. 3b, and uses the placeholder <price> in its action part:

definitions
   set 'SC1' to a shopping cart;
   set 'Camera1' to a camera in the items of SC1;
   set 'Accessory1' to a proprietary accessory in the items of SC1;
if the colour of Camera1 is "Silver" and the colour of Accessory1 is "Silver"
then the bundle {Camera1, Accessory1} is priced at <price> for SC1;

Once such a rule has been added to the rule set, the case will no longer appear as a case with a missing decision.

As a consequence, the scope shown in FIG. 3b no longer has a case with missing decisions. If an atomic decision is made for the cases of a given scope, it is also made for cases of larger scope that have the same characteristics. However, as larger scopes consist of additional objects, they may lead to additional instances of the generic decisions. FIG. 3b has a bundling decision for its camera and its proprietary accessory, but it has no bundling decision for a third-party accessory and an adapter. However, the scope of FIG. 3e has a third-party accessory and an adapter in addition to the objects in the scope of FIG. 3b. Further, there are rules that match objects of the scope of FIG. 3e and that make a bundling decision for the third-party accessory and the adapter. For example, if the camera is white and the third-party accessory is black, rule b2 proposes a bundle consisting of the third-party accessory and the adapter, and none of the ten rules makes a pricing decision. Hence, the scope of FIG. 3e has a case with missing decisions. As explained above, this can be resolved by adding the following rule that makes a ghost decision:

definitions
   set 'SC1' to a shopping cart;
   set 'Camera1' to a camera in the items of SC1;
   set 'Adapter1' to an adapter in the items of SC1;
   set 'Accessory1' to a proprietary accessory in the items of SC1;

set 'Accessory2' to a third party accessory in the items of SC1;
if the colour of Camera1 is "White" and the colour of Accessory2 is "Black"
then the bundle {Adapter1, Accessory2} is priced at <price> for SC1;

It can be seen that the case with missing decisions in the scope of FIG. 3e can be reduced to a case of the scope of FIG. 3d if the proprietary accessory is removed. As this reduced case contains a white camera and a black third-party accessory, rule b2 will again propose a bundle consisting of the third-party accessory and the adapter and none of the ten rules will make a pricing decision. It is thus possible to reduce certain cases with missing decisions to cases with missing decisions of smaller scopes. As the reduced case with missing decisions occurs in a scope with fewer objects, a rule that makes the missing decision for this case matches fewer objects:

definitions
    set 'SC1' to a shopping cart;
    set 'Camera1' to a camera in the items of SC1;
    set 'Adapter1' to an adapter in the items of SC1;
    set 'Accessory1' to a third party accessory in the items of SC1;
if the colour of Camera1 is "White" and the colour of Accessory1 is "Black"
then the bundle {Adapter1, Accessory1} is priced at <price> for SC1;

Such a rule of smaller scope is more general than a rule of larger scope and same condition, as it is applicable to more cases. In particular, it makes the missing decision for the considered case in the scope of FIG. 3e. It is therefore advantageous to reduce cases with missing decisions to cases of minimal scope that have the same missing decisions. Alternatively, it is possible to start the search for cases with missing decisions starting in scopes of smaller size and to proceed to larger scopes once all smaller scopes have been completed.

The operation of the computer system 1 is now described with reference to FIGS. 4a to 4f. As described in detail below, the computer system 1 is able to identify cases with missing decisions as described above. It is also able to eliminate the cases with missing decisions by adding rules that treat those cases and that have a placeholder for the action or for parts of it. Processing of data is performed by the processor system 2, which data being temporarily stored in the memory 3, or stored in the persistent memory 4 and/or external persistent memory 5 as appropriate.

It will be appreciated that the computer system 11 of FIG. 2 could operate in a similar manner to identify cases with missing decisions, by processing data using the processor system 12 and storing data in the memory 13 and/or persistent memory 14 as appropriate.

Figure 4A:
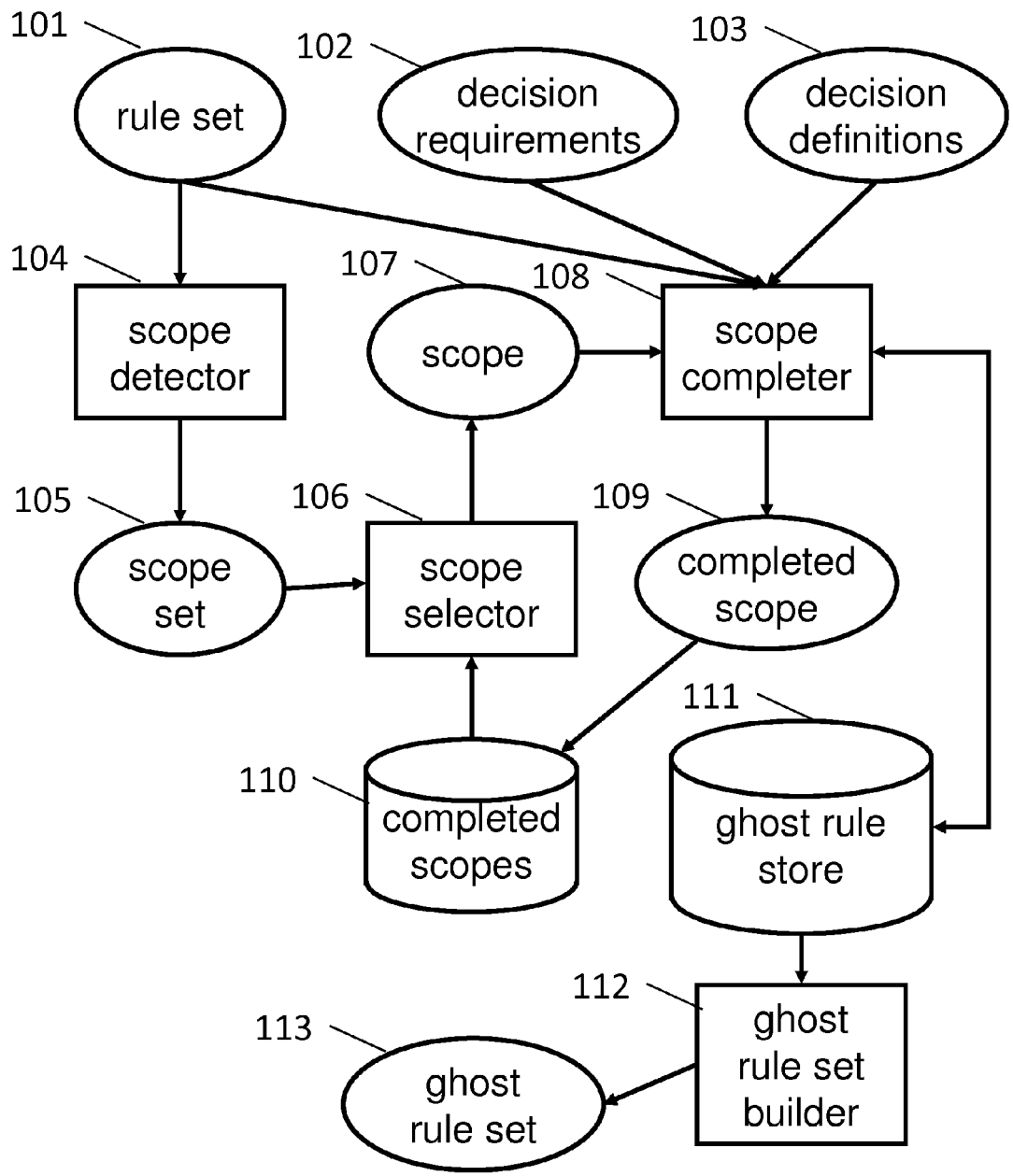
FIG. 4a is a data-flow chart showing the operation of the computer system of FIG. 1 to complete all cases with missing decisions in all scopes by generating rules with ghost decisions.

FIG. 4a is a data-flow chart showing the operation of the computer system 1 to complete all cases with missing decisions in all scopes by generating rules with ghost decisions. The computer system 1 receives from the remote computer device 6 a rule set 101, a set of decision requirements 102, and a set of decision definitions 103. The set of decision definitions 103 is the set of distinct atomic decisions made by the rules in the rule set 101. In alternative embodiments, the computer system 1 receives only the rule set 101 and set of decision requirements 102, and generates the set of decision definitions 103 itself from the rule set 101 using the processor system 2. The rule set 101, set of decision requirements 102, and set of decision definitions 103 may be stored in the persistent memory 4 and/or external persistent memory 5, depending for example on size limitations.

The operation shown by the data-flow chart of FIG. 4a is iterative. In the first iteration, a scope detector 104 analyses the scopes of the rules in the rule set 101 and returns a scope set 105, as described below. Each scope in the scope set 105 consists of a list of typed objects. A scope selector 106 selects a scope 107 from the scope set 105 and passes it to a scope completer 108. The operation of the scope completer 108 is described in detail later below. The scope completer 108 extracts all rules from the rule set 101 that match all or some objects of the scope 107. It then determines all cases of the scope 107 that have missing decisions. When doing this, it takes the decision requirements 102 and decision definitions 103 into account. The scope completer 108 generates ghost rules (i.e. rules with ghost decisions) to complete the decisions for the scope 107. The ghost rules are generated so that they make the missing decisions for the detected cases and ensure that there are no longer cases of the given scope that have missing decisions according to the rule set 101 and the ghost rules. The scope completer 108 adds the generated ghost rules to a ghost rule store 111, which is empty initially. Further, it adds the completed scope 109 to a store of completed scopes 110, which also is empty initially.

In the next iterations, the scope selector 106 selects a new scope 107 from the scope set 105, i.e. a scope that is not in the store of completed scopes 110. The scope completer 108 then again determines cases with missing decisions for the new scope 107, while also taking previously generated ghost rules from the ghost rule store 111 into account. As above, it then generates new ghost rules for these cases. The completed scope 109 is added to the store of the completed scopes 110, and the iteration is continued until all scopes in the scope set 105 have been completed and are in the store of completed scopes 110. In a final step, a ghost rule set builder 112 creates a ghost rule set 113 containing the ghost rules in the ghost rule store 111. As discussed above, domain expert or an external system can then complete the ghost rules by choosing actions for the ghost decisions.

The operation of the scope detector 104 is now described. The scope detector 104 inspects each rule and extracts the scope of the rule by canonically renaming the objects matched by the rule according to their types. Two rules have the same scope if they match the same number of objects for each type. A scope is a list of canonically named objects together with their type. In an example canonical naming scheme, a name consists of the type followed by a number, starting at 1. For example, rule b1 matches three objects, namely a shopping cart, a camera, and a proprietary accessory, which can be named as ShoppingCart1, Camera1, and ProprietaryAccessory1. If some other rule is matching two objects of same type, say two objects of type camera, then those objects may be named as Camera1 and Camera2 when representing the scope. However, it will be appreciated that any other suitable naming scheme could be used.

The scope detector 104 maintains a set of scopes 105, which is initially empty. If an extracted rule scope is not included in the scope set 105, the scope detector 104 adds the scope to the scope set 105. Once the scope detector 104 has inspected all rules, it returns the scope set 105, which contains the scopes of all rules in the rule set 101.

The scope set 105 of the example above contains five scopes. Rules b1, p1, p2, v1 have a scope consisting of the objects ShoppingCart1, Camera1, and ProprietaryAccessory1. Rules b4, p4 have a scope that additionally consists of an object ThirdPartyAccessory1. Rule p3 has a scope consisting of the objects ShoppingCart1, ThirdPartyAccessory1 and Adapter1. Rules b2, r1 have a scope that additionally consists of an object Camera1. Finally, rule b3 has a scope that additionally consists of an object ProprietaryAccessory1.

Figure 4B:
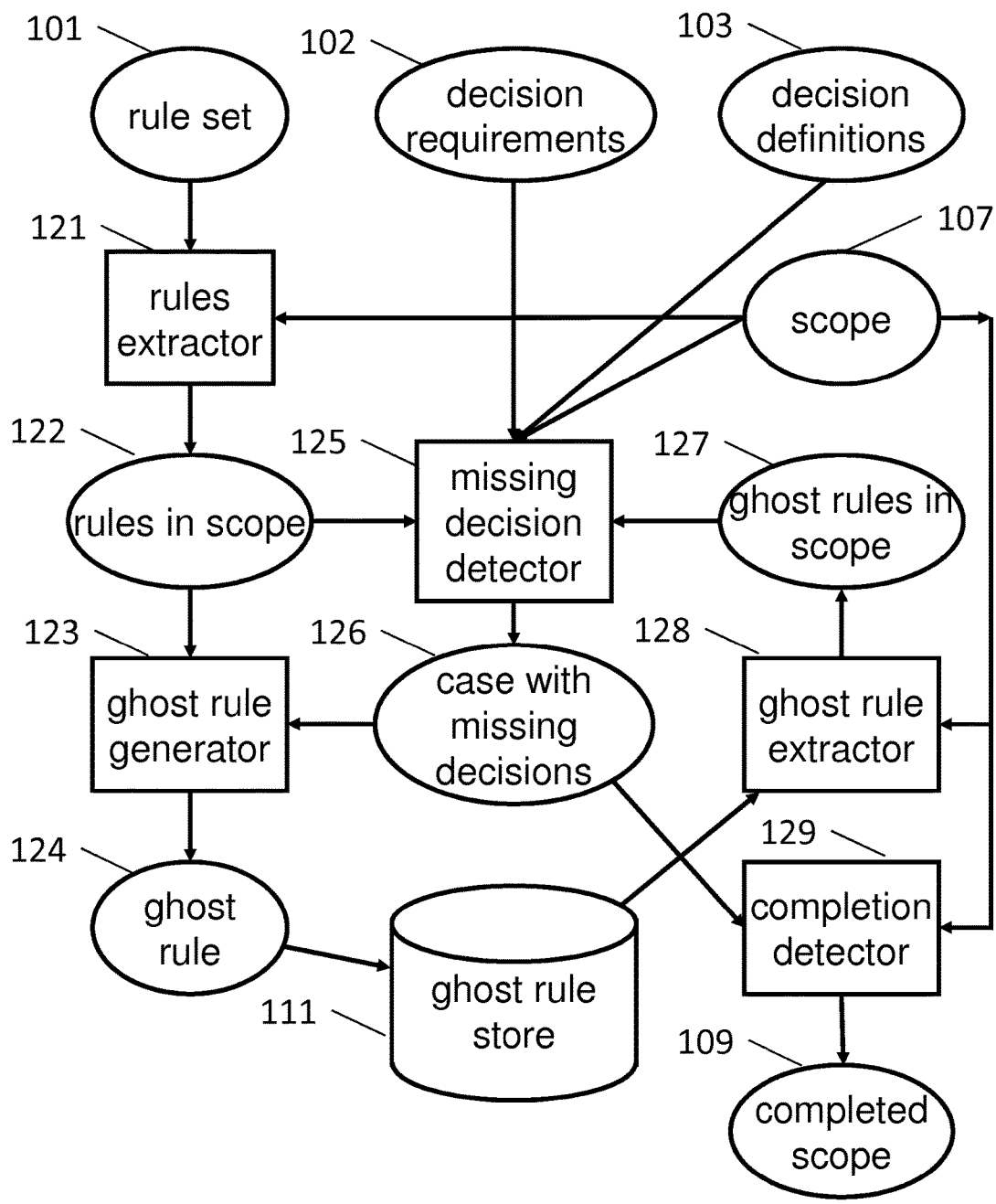

The operation of the scope completer 108 is now described, with reference to the data-flow chart of FIG. 4b. As discussed above, the scope completer 108 is provided with the rule set 101, the set of decision requirements 102, the set of decision definitions 103, and the selected scope 107. Further, it interacts with the ghost rule store 111, and can retrieve existing ghost rules from the ghost rule store 111 and add new ghost rules to it.

In a first step, a rules extractor 121 extracts all rules 122 from the rules set 101 that match some or all objects in the scope 107. For example, it will extract rules p3, b2, r1 from the rule set 101 if the scope consists of ShoppingCart1, ThirdPartyAccessory1, Adapter1, and Camera1, as those rules match some or all objects of the scope 107. The rules extractor 121 passes the set of rules 122 to a missing decision detector 125. Similarly, a ghost rule extractor 128 retrieves all ghost rules 127 from the ghost rule store 111 that match some or all objects in the scope 107. Initially, the ghost rule store 111 will be empty, meaning that the ghost rule extractor 128 extracts an empty set of ghost rules 127 when the first case with missing decisions is being determined. The ghost rule extractor 128 passes the set of extracted ghost rules 127, whether it is empty or not, to the missing decision detector 125.

The missing decision detector 125 determines cases with missing decisions 126 from among the cases of the scope 107. The operation of the missing decision detector 125 is described in detail later below. When doing this, it takes the given decision requirements 102 and decision definitions 103 into account. If the missing decision detector 125 is able to identify a case with missing decisions 126, it passes it to the ghost rule generator 123. The ghost rule generator 123 generates a ghost rule 124 and adds it to the ghost rule store 111, as described above.

In the next iteration, the ghost rule extractor 128 will retrieve the ghost rule 124 from the ghost rule store 111, as it matches all objects of the given scope. The missing decision detector 125 will then take the ghost decision made by this ghost rule 124 into account. As a consequence, it may find another case with a missing decision. The iteration continues until the missing decision detector 125 does not find any cases with missing decisions for the given scope. It may report this by returning an undefined case with missing decisions (e.g. by using a null object), for example. The missing decision detector 125 also passes its result, whether it is defined or not, to a completion detector 129. If the completion detector 129 receives an undefined case with a missing decision, it determines that no further cases with missing decisions can be determined for the scope 107, and returns the scope 107 as completed scope 109.

Figure 4C:
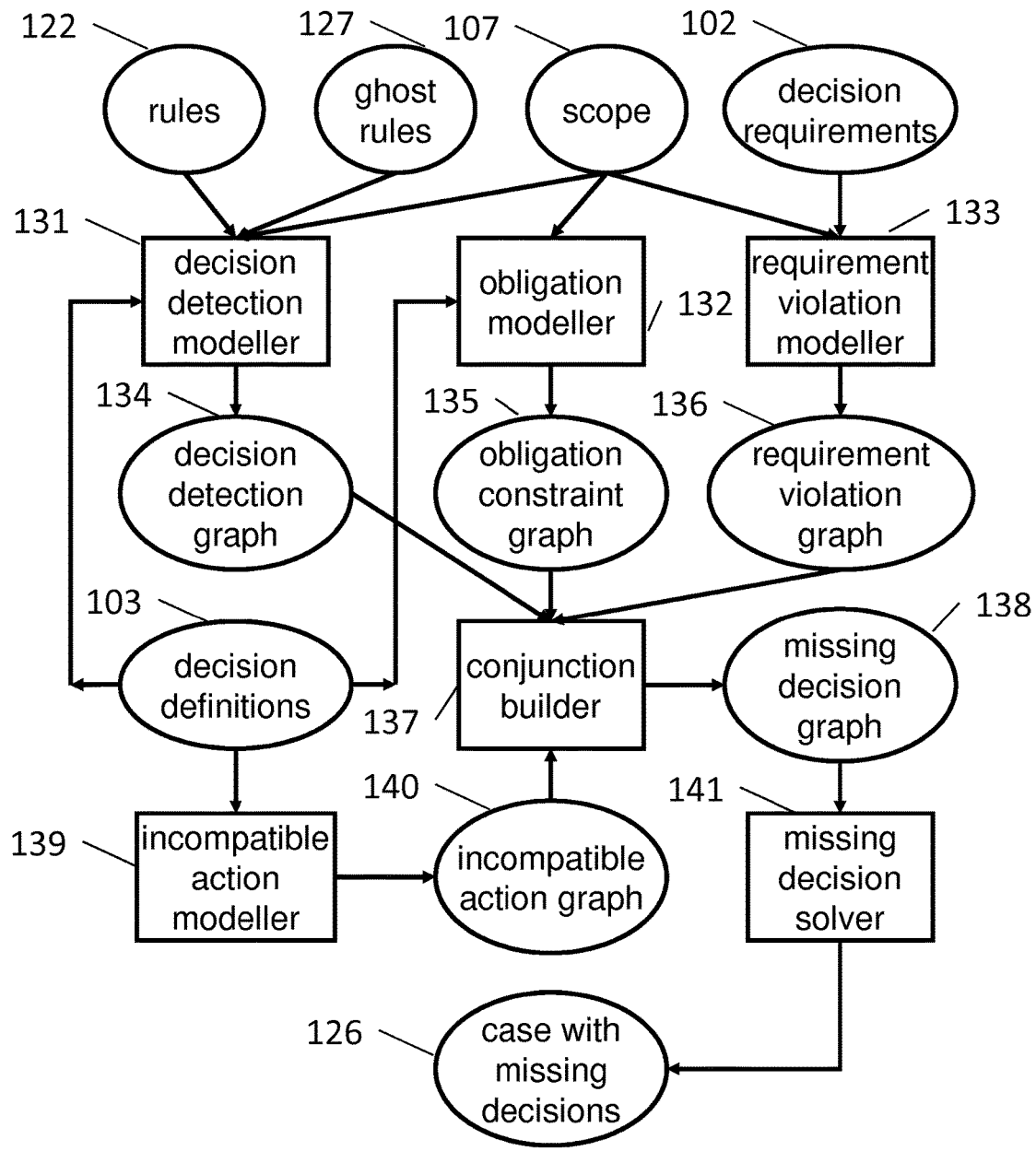
FIG. 4c is a data-flow chart showing the operation of the missing decision detector of FIG. 4b.

The operation of the missing decision detector 125 is now described, with reference to the data-flow chart of FIG. 4c. As discussed above, the missing decision detector 125 is supplied with a scope 107, a set of rules 122 in the scope and a set of ghost rules 127 that match objects of the scope, a set of decision requirements 102, and a set of decision definitions 103. The missing decision detector 125 determines whether there exists a case of the scope 107 such that the rules 122 and ghost rules 127 make some, but not all of the required decisions. If it is able to identify such a case, it returns it. Otherwise, it returns a null object to indicate that no such case exists or that no such case could be identified within a predetermined time limit. By using a predetermined time limit, problems arising due to looping or rules that take an excessive amount time to be processed are avoided, without false positives (i.e. cases that do not in fact have a missing decision) being returned.

The missing decision detector 125 builds four constraint graphs modelling different properties of cases with missing decisions. The constraints are formulated in a logical language involving conjunction, disjunction, implication, and negation operators, universal and existential quantification, function symbols, and predicates for arithmetic, string algebra, set algebra, and any other algebra needed to model rule conditions. Constraints are represented by graphs that consist of a node for each sub-expression of the constraints. If an expression consists of an operation and sub-expressions, then the node of this expression is labelled by the operation and has outgoing edges to the nodes for the sub-expression. The modellers build the graph representation of constraints in a canonical way. This means that the system maintains a single graph representation of each constraint by storing all created graph nodes in a global store (not shown in the figures). When building a graph node, a modeller first determines whether such a graph node has already been created. If it has, it retrieves the graph node, otherwise it builds a new one and adds it to the global store.

An obligation modeller 132 is supplied with the decision definitions 103 and the scope 107 and returns an obligation constraint graph 135, which requires that at least one atomic decision is made for cases of the scope 107. A requirement violation modeller 133 is supplied with the decision requirements 102 and the scope 107 and returns a requirement violation graph 136, which requires that at least one decision requirement is violated by cases of this scope. A decision detection modeller 131 is supplied with the scope 107, the rules 122 in the scope, the ghost rules 127 in the scope, and the decision definitions 103 and returns a decision detection graph 134. The operation of the decision detection modeller 131 is described in more detail later below. The decision detection graph 134 characterises the cases under which a decision will be made by the rules 122 and ghost rules 127 when applied to objects in the scope 107. For each decision, the decision detection graph 134 gives the exact conditions under which this decision will be made. Finally, an incompatible action modeller 139 is supplied with the decision definitions 103 and returns an incompatible action graph 140 which requires that a single atomic action can be applied for each of the atomic decisions. A conjunction builder 137 is supplied with all four graphs, and builds a missing decision graph 138 which describes the cases with missing decisions. Each solution of this missing decision graph 138 corresponds to a case with a missing decision and vice versa. A missing decision solver 141 is supplied with the missing decision graph 138 and returns a case with missing decisions 126 if the missing decision graph 138 has a solution. Otherwise, it returns a null object.

The obligation constraint graph 135 requires that at least one atomic decision needs to be made by the considered cases. It therefore excludes missing cases for which no decision is made at all. The obligation modeller 132 first builds an existentially quantified constraint graph that is valid for all scopes and then instantiates it for the objects in the given scope. For each of the given decision definitions 103, the obligation modeller 132 creates a constraint graph that represents the fact that the decision has been made for some object. For example, if the decision is a pricing decision for a shopping cart, a camera, and a proprietary accessory, this graph describes the following constraint:
there exists a shopping cart s, a camera c, and a proprietary accessory o such that the pricing decision is made for s and {c, o}

The obligation modeller 132 builds this graph by introducing a leaf node for each object in the scope of the considered decision and labelling it with variables representing the objects to which the decision may be applied. As the pricing decision may be applied to a shopping cart, a camera, and a proprietary accessory, the graph above has three leaf nodes for the variables s, c, and o. Further, the obligation modeller 132 creates a graph node such as the pricing decision is made for s and {c, o} that represents the decision. This node has outgoing edges to the leaf nodes. Finally, the obligation modeller 132 creates the root node of the graph and labels it with an existential quantification of each of the variables considered before.

The obligation modeller 132 repeats these steps for each of the decision definitions 103. It then builds an existentially quantified obligation graph by introducing a root node that has outgoing edges to all the existentially quantified graphs obtained for the different decisions. This root node is marked as a disjunction. It represents the fact that one of the considered decisions needs to be made for some of the objects. For the five decision definitions of the considered example, the obligation modeller 132 builds the following obligation constraint:
one of the following conditions is true:
　there exists a shopping cart s, a camera c, and a proprietary accessory o such that the pricing decision is made for s and {c, o}
　there exists a shopping cart s, a third-party accessory t, and an adapter a such that the pricing decision is made for s and {t, a}
　there exists a shopping cart s, a camera c, and a proprietary accessory o such that the bundling decision is made for s and {c, o}
　there exists a shopping cart s, a third-party accessory t, and an adapter a such that the bundling decision is made for s and {t, a}
　there exists a shopping cart s such that a voucher decision is made for s In a second step, the obligation modeller 132 instantiates the graph for objects of the scope 107, thus ensuring that only decisions concerning objects of the scope 107 are considered. For example, for the scope of FIG. 3b consisting of the objects ShoppingCart1, Camera1, and ProprietaryAccessory1, for each existentially quantified node, the obligation modeller 132 determines all combinations of objects from the scope 107 that can instantiate the existentially quantified variables of the node while respecting type constraints. For example, the quantifier:
there exists a shopping cart s, a camera c, and a proprietary accessory o
has a variable s of type shopping cart, which can be instantiated by object ShoppingCart1, a variable c, which can be instantiated by object Camera1, and a variable o, which can be instantiated by object ProprietaryAccessory1. No other instantiation is obtained since there is only a single shopping cart, a single camera, and a single proprietary accessory in the scope. For each of the combinations, the obligation modeller 132 instantiates the body of the quantified constraint by replacing each occurrence of a variable by the chosen object. This may lead to none, one, or several instantiations of the constraint. If there is none, the obligation modeller 132 drops the constraint. If there is one, the obligation modeller 132 replaces the existentially quantified constraint by the instantiation. If there are several instantiations, the obligation modeller 132 replaces the existentially quantified node by a node representing the disjunction of the instantiated constraints.

In the example above, there is at most a single object of each type, meaning that none or one instantiation is obtained. This leads to the following obligation constraint graph for scope of FIG. 3b:
one of the following conditions is true:
　the pricing decision is made for ShoppingCart1 and {Camera1, ProprietaryAccessory1}
　the bundling decision is made for ShoppingCart1 and {Camera1, ProprietaryAccessory1}
　the voucher decision is made for ShoppingCart1

This expresses the fact that either a pricing or bundling decision for ShoppingCart1 and the bundle of Camera1 and ProprietaryAccessory1 needs to be made or a voucher decision for ShoppingCart1 needs to be made. It will be appreciated that other scopes will lead to other obligation constraints.

The requirement violation modeller 133 builds a requirement violation graph 136 that requires that at least one decision requirement 102 is violated by the considered cases. The requirement violation graph 136 is formulated over the alternative actions of the atomic decisions and is true for a set of applied actions if and only if this set of applied actions violates one of the decision requirements 102. The alternative actions are declared in the definitions of the atomic decisions and correspond to constraints that are true if the actions are applied and false it the actions are not applied.

For each of the atomic decisions, the requirement violation modeller 133 builds a decision definition constraint graph that describes the fact that a decision is made if one of its alternative action is applied. For this purpose, the requirement violation modeller 133 builds a constraint graph that has a leaf node for each variable in the scope of the decision definition 103. The requirement violation modeller 133 introduces a graph node for each action declaration in the decision definition 103. These graph nodes have outgoing edges to the leaf nodes. Moreover, the requirement violation modeller 133 introduces an additional node indicating that the decision may be made by a ghost decision. It also has outgoing edges to the leaf nodes. Further, the requirement violation modeller 133 introduces a node that has outgoing edges to all nodes representing action declarations as well as to the node for the ghost decision. This node is marked as a disjunction. Further, the requirement violation modeller 133 creates a node representing that the decision is made. This node has outgoing edges to the leaf nodes representing variables. The requirement violation modeller 133 creates a node that has outgoing edges to the decision node as well as to the node representing the disjunction of actions and marks this node as an equivalence. Finally, the requirement violation modeller 133 creates a node that represents the decision definition 103 and that has an outgoing edge to the node representing the equivalence. This node is labelled with universal quantifications of all the variables in the scope of the decision definition 103. For the example of the voucher and bundle decisions, the requirement violation modeller 133 will build constraint graphs representing the following constraints:
for all shopping carts s:
the voucher decision is made for s iff a voucher is offered for s or a voucher is denied for s or a ghost voucher decision is made for s for all shopping carts s, cameras c, and proprietary accessory o:
the bundle decision is made for s and {c, o} iff the bundle {c, o} is proposed for s or the bundle {c, o} is forbidden for s or the ghost bundle decision is made for s and {c, 0}
for all shopping carts s, third-party accessory t, and adapters a:
the bundle decision is made for s and {t, a} iff the bundle {t, a} is proposed for s or the bundle {t, a} is forbidden for s or the ghost bundle decision is made for s and {t, a}

The operation described so far works for decision definitions 103 that list all the actions in extensional form. If a decision definition 103 has action declarations in intensional form and involves variables, then the requirement violation modeller 133 builds action nodes for those declarations in the following way. Given an action declaration in intensional form, the requirement violation modeller 133 introduces a leaf node for each variable in the where-clause of this action declaration. It then creates a node for the action introduced by the action declaration. This node has outgoing edges to the leaf nodes corresponding to the variables of the action declaration as well as to the leaf nodes corresponding to the variables of the decision definition 103. Further, the requirement violation modeller 133 creates a node for the action declaration. This node has an outgoing edge to the node for the action and it is labelled by the existential quantification of the variables of the action declaration. The remainder of the constraint graph of the decision definition 103 is constructed as described above. For the pricing decisions, the requirement violation modeller 133 will build constraint graphs representing the following constraints:
for all shopping carts s, cameras c, and proprietary accessory o:
the pricing decision is made for s and {c, o} iff there exists a number p such that the bundle {c, o} is priced at p for s or the ghost pricing decision is made for s and {c, o}
for all shopping carts s, third-party accessory t, and adapters a:
the pricing decision is made for s and {t, a} iff there exists a number p such that the bundle {t, a} is priced at p for s or the ghost pricing decision is made for s and {t, a}

It will be appreciated that the constraint graphs constructed for the decision definitions are valid for all scopes. Once the requirement violation modeller 133 has built constraint graphs for all decision definitions, it creates a node that has outgoing edges to those constraint graphs and marks it as a conjunction.

In a second step, the requirement violation modeller 133 instantiates this conjunction of quantified decision definition constraints for the objects of the scope 107. It proceeds in a similar way as the obligation modeller 132 in this respect. For example, it will create the following instantiated decision definition constraint graph for the scope of FIG. 3b, which consists of the objects ShoppingCart1, Camera1, ProprietaryAccessory1:
all of the following conditions are true:
  the voucher decision is made for ShoppingCart1 iff a voucher is offered for ShoppingCart1 or a voucher is denied for ShoppingCart1 or a ghost voucher decision is made for ShoppingCart1
  the bundle decision is made for ShoppingCart1 and {Camera1, ProprietaryAccessory1} iff the bundle {Camera1, ProprietaryAccessory1} is proposed for ShoppingCart1 or the bundle {Camera1, ProprietaryAccessory1} is forbidden for ShoppingCart1 or the ghost bundle decision is made for ShoppingCart1 and {Camera1, ProprietaryAccessory1}
  the pricing decision is made for ShoppingCart1 and {Camera1, ProprietaryAccessory1} iff there exists a number p such that the bundle {Camera1, ProprietaryAccessory1} is priced at p for ShoppingCart1 or the ghost pricing decision is made for ShoppingCart1 and {Camera1, ProprietaryAccessory1}

Given a set of applied actions, this decision definition constraint graph determines which decisions are made by these applied actions and which are not made for objects of the scope 107. A node representing that a decision is made is labelled true if the decision is effectively made by some of the applied actions and it is labelled false otherwise.

For each of the decision requirements 102, the requirement violation modeller 133 builds a negated decision requirement graph that requires that the made decisions and applied actions violate this decision requirement 102. For this purpose, the requirement violation modeller 133 processes the description of the decision requirement 102 and inverts all logical operators. It replaces universal quantifiers by existential quantifiers, disjunctions by conjunctions, and vice versa. It replaces a negated constraint by the non-negated constraint. It replaces an atomic constraint by the negation of this constraint. As an implication between an antecedent and a consequent corresponds to a disjunction of the negated antecedent and the consequent, the requirement violation modeller 133 replaces it by the conjunction of the antecedent and the negated consequent. For example, the requirement violation modeller 133 transforms the following decision requirement:
for all shopping carts s, cameras c, and proprietary accessory o: if the bundle {c, o} is proposed for s then the pricing decision is made for s and {c, o}
into the following negated decision requirement:
there exists a shopping cart s, camera c, and proprietary accessory o such that the bundle {c, o} is proposed for s and the pricing decision is not made for s and {c, o}

Once the requirement violation modeller 133 has built negated decision requirement graphs for all decision requirements 102, it creates a node that has outgoing edges to those constraint graphs and that represents their disjunction. For the example above, it creates a node that represents the following constraint. This constraint is valid for all scopes:
one of the following conditions is true:
  there exists a shopping cart s, camera c, and proprietary accessory o such that the bundle {c, o} is proposed for s and the pricing decision is not made for s and {c, o}
  there exists a shopping cart s, third-party accessory t, and adapter a such that the bundle {t, a} is proposed for s and the pricing decision is not made for s and {t, a}

In a second step, the requirement violation modeller 133 instantiates the disjunction of the negated decision requirements 102 for the objects of the scope 107. For example, it will create the following instantiated graph for the scope of FIG. 3e which consists of the objects ShoppingCart1, Camera1, ProprietaryAccessory1, ThirdPartyAccessory1, Adapter1:
one of the following conditions is true:
  the bundle {Camera1, ProprietaryAccessory1} is proposed for ShoppingCart1 and the pricing decision is not made for ShoppingCart1 and {Camera1, ProprietaryAccessory1}
  the bundle {ThirdPartyAccessory1, Adapter1} is proposed for ShoppingCart1 and the pricing decision is not made for ShoppingCart1 and {ThirdPartyAccessory1, Adapter1}

For scope of FIG. 3b which consists of the objects ShoppingCart1, Camera1, and ProprietaryAccessory1, the requirement violation modeller 133 will create the following instance:
the bundle {Camera1, ProprietaryAccessory1} is proposed for ShoppingCart1 and the pricing decision is not made for ShoppingCart1 and {Camera1, ProprietaryAccessory1}

This constraint is satisfied if the bundle consisting of the Camera1 and ProprietaryAccessory1 is proposed for ShoppingCart1, but no pricing decision is made for this shopping cart. In order to check this, it is not only necessary to determine the actions that the rules 122 are applying to a case, but also to detect which decisions are not made by the rules 122.

Once the requirement violation modeller 133 has built the conjunctive constraint graph for all decision definitions 103 and the disjunctive constraint graph for the negated requirement constraints, it creates a node that has outgoing edges to these two constraint graphs and marks it as a conjunction. The requirement violation modeller 133 returns the resulting combined graph as the requirement violation graph 136.

Figure 4D:
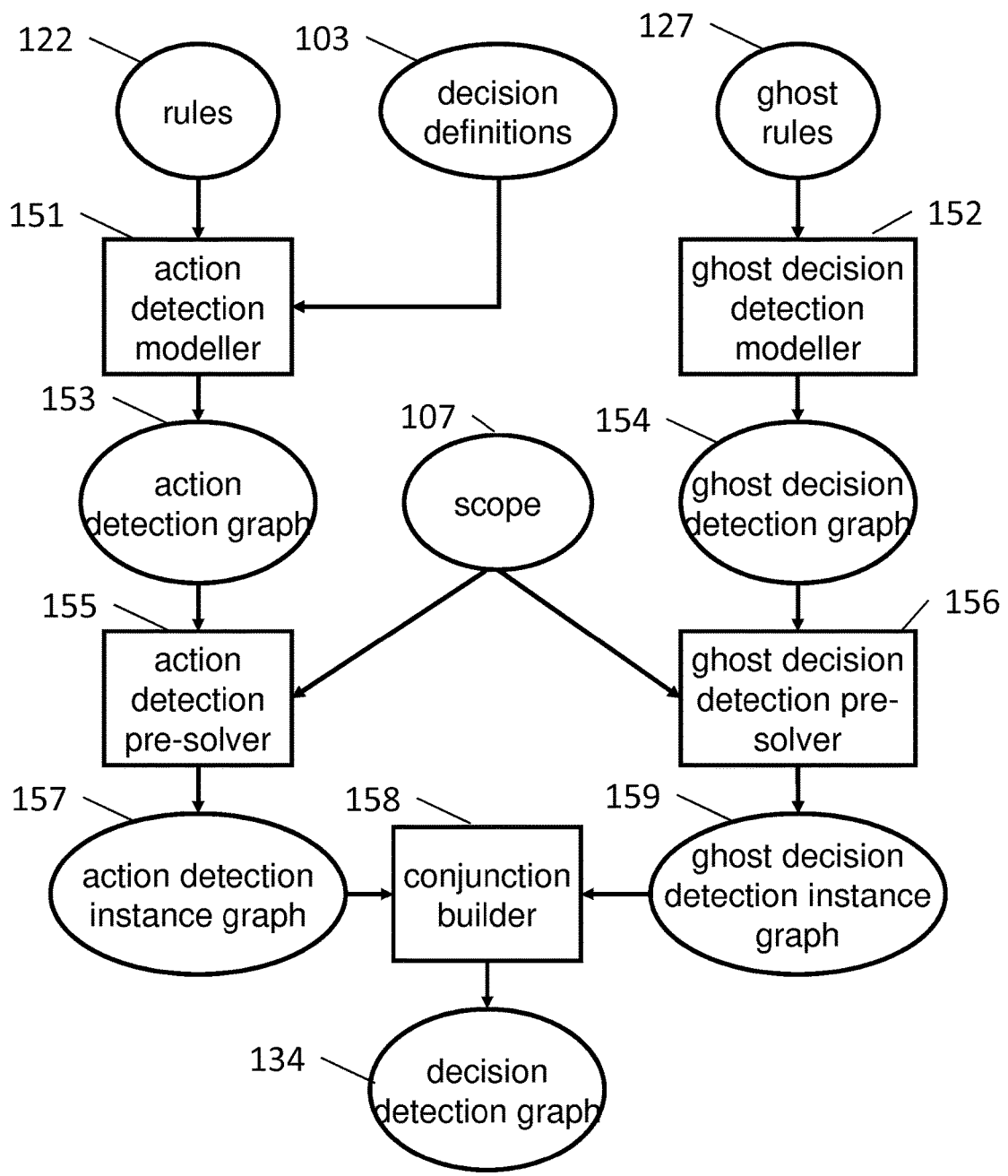
FIG. 4d is a data-flow chart showing the operation of the decision detection modeller of FIG. 4c.

The operation of the decision detection modeller 131 is now described with reference to the data-flow chart of FIG. 4d. As described above, the decision detection modeller 131 is supplied with the scope 107, the set of rules 122 and the set of ghost rules 127 that are both matching some or all objects of the scope, and the set of decision definitions 103. It builds a decision detection constraint graph 134 that determines which actions are applied by the rules to a case and which actions are not applied. Further, the decision detection constraint graph 134 determines which ghost decisions are made by the ghost rules for a case and which ghost decisions are not made. As the rule application is controlled by a selected priority, only rules and ghost rules having at least the selected priority may be applied to a case. Therefore, the decision detection modeller 134 only takes the rules and ghost rules into account that have at least the selected priority.

An action detection modeller 151 builds an action detection graph 153. It introduces a leaf node representing the selected priority value. For each action declaration of each of the decision definitions 103, the action detection graph 153 specifies that the action is applied for objects of appropriate type to a given case if and only if there is a rule that is applicable to this case and that is applying the action for those objects. The action detection graph 153 describes a conjunction of universally quantified equivalences. An example is the following quantified equivalence that determines that the bundling decision is forbidden for a bundle consisting of an arbitrary third-party accessory and an arbitrary adapter if and only if the applicability condition of rule b3 is satisfied:
for all shopping carts s, third-party accessories t, adapters a: the bundling decision is forbidden for s and {t, a} if and only if one of the following conditions is true
   there exists a camera c in the items of s, a proprietary accessory o in the items of s such that the selected priority is at most 3, t is in the items of s, a is in the items of s, and the colour of c is Black In order to build the constraint graph for an action declaration, the action detection modeller 151 selects all rules from the rule set 122 that may apply this action. For each of these rules, it builds a graph for a constraint that is true if the rule is applicable and the selected priority is at most the priority of the rule. When building the constraint graph for this rule, the action detection modeller 151 introduces existentially quantified variables for all objects that are matched by the rule, but that do not occur in the scope of the action. For example, it introduces existentially quantified variables for the camera and proprietary accessory in the example given above, as rule b3 matches those objects, but they do not appear in the action of forbidding a bundling decision.

When the action detection modeller 151 has built constraint graphs for all rules that are applying an action, it creates a node that has outgoing edges to all the root node of all those constraint graphs and marks it as a conjunction. It then creates a node representing the equivalence of the action and the conjunction. This node has outgoing nodes to a node representing the action and to the node for the conjunction. Finally, the action detection modeller 151 builds a node that has an outgoing edge to this equivalence node and that has universal quantifiers for each variable occurring in the action. This results in the action detection graph for the considered action.

If an action declaration is given in an intensional form and involves variables, then the action detection modeller 151 extracts all instances of this action from the rules and builds an action detection graph for each of these action instances. When building an action detection graph for an action instance, the action detection modeller 151 selects all rules that are applying this action instance and proceeds as described before. For example, the rules apply two different instances of a pricing action for a bundle consisting of a third-party accessory and an adapter. Rule p3 prices this bundle at 500 whereas rule r1 prices it at 400. The action detection modeller 151 creates an action detection graph 153 for each of these instances:
for all shopping carts s, third-party accessories t, adapters a: the bundle {t, a} is priced at 500 for s if and only if the selected priority is at most 1, t is in the items of s, a is in the items of s, and the colour of t is White
for all shopping carts s, third-party accessories t, adapters a: the bundle {t, a} is priced at 400 for s if and only if there exists a camera c in the items of s such that the selected priority is at most 2, t is in the items of s, a is in the items of s, and the colour of c is not White Once the action detection modeller 151 has built action detection graphs for all action declarations, it builds the full action detection graph 153 by creating a node that has outgoing edges to the root nodes of all those constraint graphs and marks it as a conjunction.

In a second step, an action detection pre-solver 155 instantiates the universally quantified constraints for the objects of appropriate type in the given scope and returns an action detection instance graph 157. For each instance of each action, the action detection instance graph 157 specifies that the action instance is applied to a case if and only if there is a rule instance that is applicable to this case and that is applying the action instance. The action detection instance graph 157 is a conjunction of logical equivalences. An example is the following equivalence obtained for the scope of FIG. 3e that determines that the bundling decision is forbidden for a bundle consisting of ThirdPartyAccessory1 and Adapter1 if and only if the applicability condition of an appropriate instance of rule b3 is satisfied:
the bundling decision is forbidden for ShoppingCart1 and {ThirdPartyAccessory1, Adapter1} if and only if Camera1 is in the items of ShoppingCart1, ProprietaryAccessory1 in the items of ShoppingCart1, the selected priority is at most 3, ThirdPartyAccessory1 is in the items of ShoppingCart1, Adapter1 is in the items of ShoppingCart1, and the colour of Camera1 is Black In addition to the action detection modeller 151, a ghost decision detection modeller 152 builds a ghost decision detection graph 154. For each of the atomic decisions, the ghost decision detection graph 154 specifies that the ghost decision is made for objects of appropriate type and a given case if and only if there is a ghost rule that is applicable to this case and that is making the ghost decision for those objects. The ghost decision detection graph 154 describes a conjunction of universally quantified constraints. An example is the following constraint:

for all shopping carts s, cameras c, proprietary accessories o: the ghost pricing decision is made for s and {c, o} if and only if one of the following conditions is true the selected priority is at most 2, c is in the items of s, o is in the items of s, the colour of c is Silver, and the colour of o is Silver A ghost decision detection pre-solver 156 instantiates the universally quantified constraint for the objects of appropriate type in the scope 107 and returns a ghost decision detection instance graph 159. For each instance of each atomic decision, the ghost decision detection instance graph 159 specifies that the ghost decision instance is made for a case if and only if there is a ghost rule instance that is applicable to this case and that is making the ghost decision instance. The ghost decision detection instance graph 159 is a conjunction of logical equivalences. An example is the following equivalence obtained for scope of FIG. 3b:

the ghost pricing decision is made for ShoppingCart1 and {Camera1, ProprietaryAccessory1} if and only if the selected priority is at most 2, Camera1 is in the items of ShoppingCart1, ProprietaryAccessory1 is in the items of ShoppingCart1, the colour of Camera1 is Silver, and the colour of ProprietaryAccessory1 is Silver Once the action detection instance graph 157 and the ghost decision detection instance graph 159 have been built, a conjunction builder 158 creates a node that has outgoing edges to the two graphs and marks it as a conjunction. The decision detection modeller 131 returns this as the decision detection graph 134.

Returning to FIG. 4c, the incompatible action modeller 139 is supplied with the set of decision definitions 103 and builds an incompatible action graph 140. The incompatible action graph 140 ensures that, for each of the atomic decisions, only a single alternative action is applied by the rules to a case. If two rules apply two different alternative actions of the same decisions to a case and the rules have at least the selected priority, then these actions are incompatible and cannot be both effective. Hence, such a case will have conflicting actions under the selected priority. As a consequence, this case will not be considered by the analysis of cases with missing decisions for the selected priority. The missing decision detector 125 therefore needs to increase the selected priority when examining this case. Moreover, if the case has conflicting actions under the highest priority level of the rules, this case will not considered at all by the analysis of cases with missing decisions.

For each of the decision definitions 103, the incompatible action modeller 139 builds constraint graphs stating that two different alternative actions of this decision cannot be both applied. For example, it builds the following constraint stating that a bundle cannot be both proposed and forbidden:

for all shopping carts s, cameras c, and proprietary accessories o:
the bundle {c, o} is not proposed for s or the bundle {c, o} is not forbidden for s Such a constraint is created for each pair of action declarations. Given such a pair, the incompatible action modeller 139 builds a node for each action declaration that represents the negation of the action. If an action declaration is in intensional form, this node will introduce universal quantifiers for the variables of the action declaration. For example, the following node will be created for the declaration of the pricing action:

for all numbers p: the bundle {c, o} is not priced at p for s.

When the incompatible action modeller 139 has built such a node for each of two considered action declarations, it builds a node representing their disjunction. Further, it builds a node representing the universal quantification of this disjunction for the variables in the scope of the decision definition.

Further, the incompatible action modeller 139 builds a constraint for each action declaration in intensional form. This constraint ensures that two different instances of the declared action cannot be both applied. These instances are characterised by different values for the variables occurring in the action declaration. The incompatible action modeller 139 therefore introduces two quantified variables for each variable in the considered action declaration. It adds a constraint stating that the corresponding instances of that action cannot be both applied if these values are different. For example, the modeller will build the following constraint for the pricing action:

for all shopping carts s, cameras c, and proprietary accessories o:
for all numbers p1, numbers p2: if p1 is different to p2 then the bundle {c, o} is not priced at p1 for s or the bundle {c, o} is not priced at p2 for s.

Once the incompatible action modeller 139 has constructed these constraint graphs for each pair of action declarations of each decision definition 103 and for each action declaration in intensional form, then it builds a node that represents the conjunction of those constraint graphs.

In a second step, the incompatible action modeller 139 instantiates this conjunction of quantified incompatible action constraint graphs for objects of a given scope. For the scope of FIG. 3b which consists of the objects ShoppingCart1, Camera1, and ProprietaryAccessory1, the modeller will create the following instances: all of the following conditions are true:

a voucher is not offered for ShoppingCart1 or a voucher is not denied for ShoppingCart1 the bundle {Camera1, ProprietaryAccessory1} is not proposed for s or the bundle {Camera1, ProprietaryAccessory1} is not forbidden for s for all numbers p1, numbers p2: if p1 is different to p2 then the bundle {Camera1, ProprietaryAccessory1} is not priced at p1 for ShoppingCart1 or the bundle {Camera1, ProprietaryAccessory1} is not priced at p2 for ShoppingCart1

The incompatible action modeller 139 returns this graph as the incompatible action constraint graph 140.

The missing decision solver 141 is supplied with the missing decision graph 138 which is the conjunction of the obligation constraint graph 135, the requirement violation graph 136, the decision detection constraint graph 134, and the incompatible action constraint graph 140. The decision definition constraints and incompatible action constraint contain quantifiers for action declarations in intensional form. In a first step, the missing decision solver 141 determines relevant instances of these constraints by analysing the decision detection constraints. For each action declaration in intensional form, it collects the action detection instance graphs that have been built for this action declaration. The left-hand sides of those graphs constitute those instances of the action that may actually be applied by the rules. For each of these action instances, the missing decision solver 141 extracts the instantiation of variables by values and uses this instantiation to create instances of the decision definition constraints and incompatible action constraints that are involved in this action declaration.

For example, there are two action detection instance graphs for pricing a bundle consisting of ThirdPartyAccessory1 and Adapter1 in the scope of FIG. 3d:
the bundle {ThirdPartyAccessory1, Adapter1} is priced at 500 for ShoppingCart1 if and only if the selected priority is at most 1, ThirdPartyAccessory1 is in the items of ShoppingCart1, Adapter1 is in the items of ShoppingCart1, and the colour of ThirdPartyAccessory1 is White
the bundle {ThirdPartyAccessory1, Adapter1} is priced at 400 for ShoppingCart1 if and only Camera1 is in the items of ShoppingCart1 such that the selected priority is at most 2, ThirdPartyAccessory1 is in the items of ShoppingCart1, Adapter1 is in the items of ShoppingCart1, and the colour of c is not White The first action instance is obtained by choosing the value of 500 for the price variable p and the second instance is obtained for the value 400. As a consequence, the missing decision solver 141 instantiates the existentially quantified constraints in the following decision definition constraint by these two values:
the pricing decision is made for ShoppingCart1 and {ThirdPartyAccessory1, Adapter1} iff there exists a number p such that the bundle {ThirdPartyAccessory1, Adapter1} is priced at p for ShoppingCart1 or the ghost pricing decision is made for ShoppingCart1 and {ThirdPartyAccessory1, Adapter1}

It then replaces the existentially quantified constraint by the disjunction of the two instances:
the pricing decision is made for ShoppingCart1 and {ThirdPartyAccessory1, Adapter1} iff the bundle {ThirdPartyAccessory1, Adapter1} is priced at 500 for ShoppingCart1 or the bundle {ThirdPartyAccessory1, Adapter1} is priced at 400 for ShoppingCart1 or the ghost pricing decision is made for ShoppingCart1 and {ThirdPartyAccessory1, Adapter1}

Further, the missing decision solver 141 instantiates the existentially quantified constraint in the following incompatible action constraint:
for all numbers p1, numbers p2: if p1 is different to p2 then the bundle {ThirdPartyAccessory1, Adapter1} is not priced at p1 for ShoppingCart1 or the bundle {ThirdPartyAccessory1, Adapter1} is not priced at p2 for ShoppingCart1

As this constraint involves two number variables p1 and p2 and there are the two possible values 500 and 400 for these variables, there are four instances of this constraint. However, two them choose the same value for the number variables and thus do not satisfy the antecedent of the implication. The missing decision solver 141 considers only those instances that satisfy the antecedent. Further, it drops the antecedent of those instances as it is satisfied. It then builds the conjunction of all the remaining instances and replaces the incompatible action constraint by this conjunction:
all of the following conditions are true:
  the bundle {ThirdPartyAccessory1, Adapter1} is not priced at 500 for ShoppingCart1 or the bundle {ThirdPartyAccessory1, Adapter1} is not priced at 400 for ShoppingCart1
  the bundle {ThirdPartyAccessory1, Adapter1} is not priced at 400 for ShoppingCart1 or the bundle {CThirdPartyAccessory1, Adapter1} is not priced at 500 for ShoppingCart1

As both conjuncts are logically equivalent, the missing decision solver 141 may further simplify this constraint by dropping one of them.

Once the missing decision solver 141 has replaced all decision definition constraints and incompatible action constraints by quantifier-free constraints, it obtains a variable-free missing decision constraint graph.

In a second step, the missing decision solver 141 determines a labelling of the variable-free missing decision constraint graph. The missing decision solver 141 seeks to label the graph nodes with values of appropriate types. For example, it labels a node representing an arithmetic expression by some number. It labels nodes representing an object by this object. For example, it labels the node for Camera1 by Camera1 and it labels a node for the value White by White. Further, it labels a node representing a symbolic expression by some object of appropriate type. For example, it labels the node the colour of Camera1 by one of the colour values White, Silver, Black. Nodes representing set-valued expression are labelled by set of objects of appropriate type. For example, the solver labels the node the items of ShoppingCart1 by the set {Camera1, ProprietaryAccessory1}. It will be appreciated that in other embodiments, other labelling schemes could be used.

The missing decision solver 141 seeks a labelling of the variable-free missing decision graph 138 that labels the root node with "true" and that respects the operations of the graph nodes. For example, if a node represents a conjunction and is labelled with "true", then its children nodes need to be labelled with "true" as well. Similarly, if a node represents a disjunction and is labelled with "true", then at least one of its children nodes needs to be labelled by "true". If the missing decision solver 141 finds such a labelling, it returns the labelled missing decision graph as a case with missing decisions 126. Otherwise, no such labelling exists or the solver is not able to find such a labelling within given time limits. It therefore returns a null object if it is able to prove that no labelling exists or when it hits a time-out.

Figure 4E:
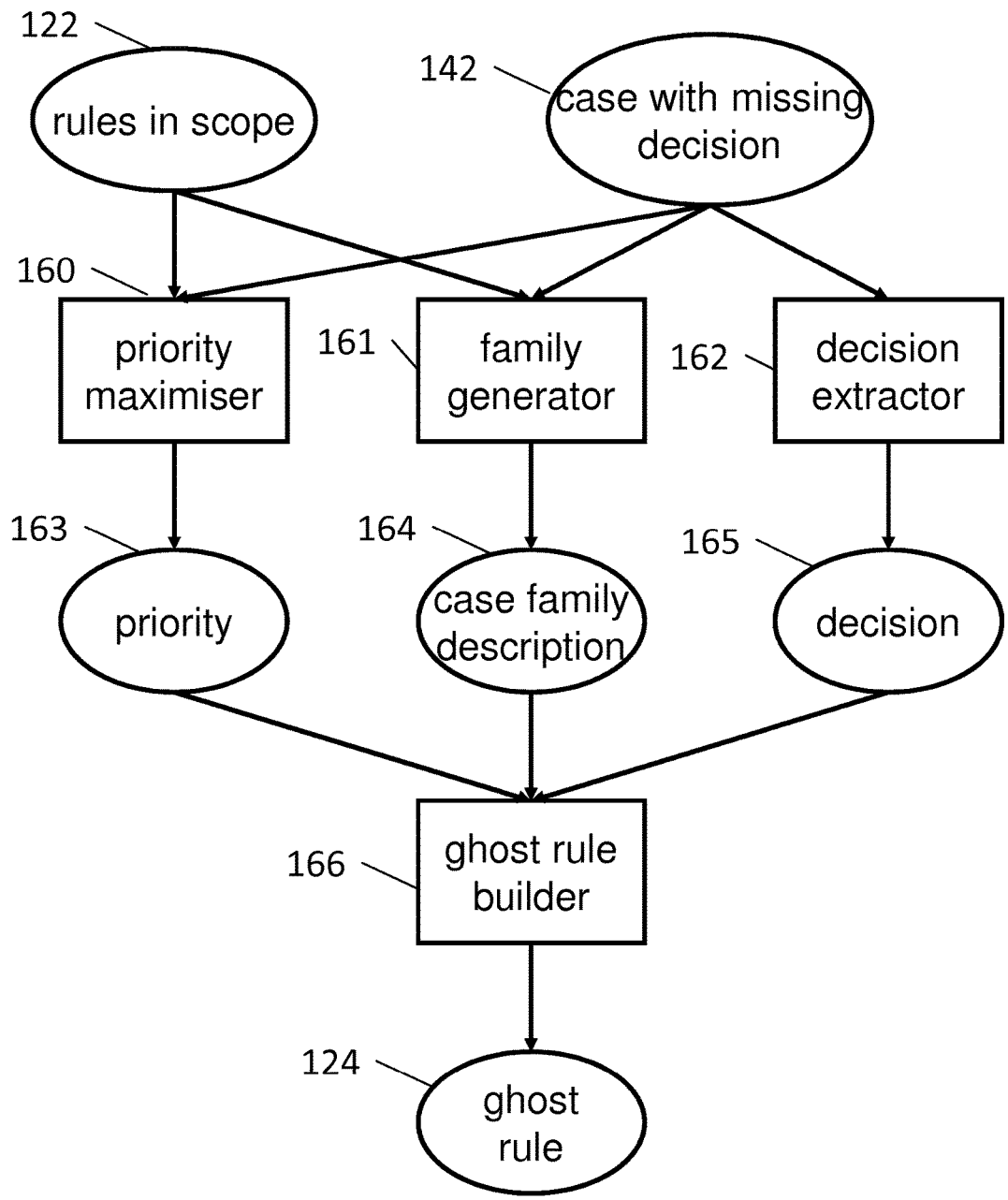
FIG. 4e is a data-flow chart showing the operation of ghost rule generator of FIG. 4b.

The operation of the ghost rule generator 123 of FIG. 4b is now described in detail, with reference to the data-flow chart of FIG. 4e. The ghost rule generator 123 is provided with the set of rules 122 and the case with missing decisions 126. The case is described by a labelling of the missing decision graph 138. Amongst other things, the labelling indicates which decisions are missing, as it assigns the value "true" to at least one of the negated decision requirements 102. A decision extractor 162 selects a negated decision requirement that is labelled by "true" and extracts a non-made decision 165 from this negated decision requirement. For this purpose, it extracts all nodes for making a decision that are labelled with false and that occur in the negated decision requirement constraint graph. It passes the identified decisions 165 to a ghost rule builder 166. The ghost rule builder 166 builds a ghost rule 124 that will make ghost decisions for each of the identified decisions 165.

Further, the given labelling assigns values to relevant attributes of the objects of the case. These assignments characterise the case. In principle, it is possible to extract a description of this case in terms of a set of object-attribute-value triples. However, it is also possible to generalise this case with missing decisions into a family of cases with missing decisions. This family contains all cases that lead to the same evaluations of all elementary tests of the rules as those obtained for the case with missing decisions. An elementary test is a logical test that does not have any other logical test as subexpression. Those elementary tests are represented in the missing decision graph 138. A family generator 161 collects all nodes for elementary tests of the rules 122 in the missing decision graph 138. If such an elementary test is labelled with true, the family generator 161 adds the elementary test to a description of the case family. If such an elementary test is labelled with false, the family generator 161 adds the negation of the elementary test to a description of the case family. The resulting set of tests forms the description of the family. Once the family generator 161 has processed all elementary tests in this way, it passes the resulting case family description 164 to the ghost rule builder 166.

The labelling also assigns a priority value to the node for the selected priority. Hence, the missing decision is obtained for the given case if all rules that have at least this priority value are applied to the case. If should be noted that the missing decision may also be obtained for a higher priority value. A priority maximiser 160 therefore increments the priority as long as the increased priority permits the application of at least one rule to the considered case. It then passes the resulting priority 163 to the ghost rule builder 166.

The ghost rule builder 166 constructs a ghost rule 124 that has the priority 163 and that makes ghost decisions for the decisions 165. The condition of the ghost rule consists of the test in the case family description 164. The ghost rule builder 166 then returns this ghost rule 124.

The operation of the computer system is now described for the example decision policy described above.

Given the rules b1 to b4, p1 to p4, r1, and v1, the scope detector 104 extracts the five scopes of FIGS. 3a to 3e, and passes them to the scope selector 106. As the store of completed scopes 110 is initially empty, the scope selector 106 may select any of those scopes. For example, it may select the scope of FIG. 3c, which is a scope of smallest size, and pass it to the scope completer 108. The rules extractor 121 selects the single rule, namely p3, that matches some or all of the three objects ShoppingCart1, ThirdPartyAccessory1 and Adapter1 of the scope of FIG. 3c and passes it to the missing decision detector 125.

Figure 5A:
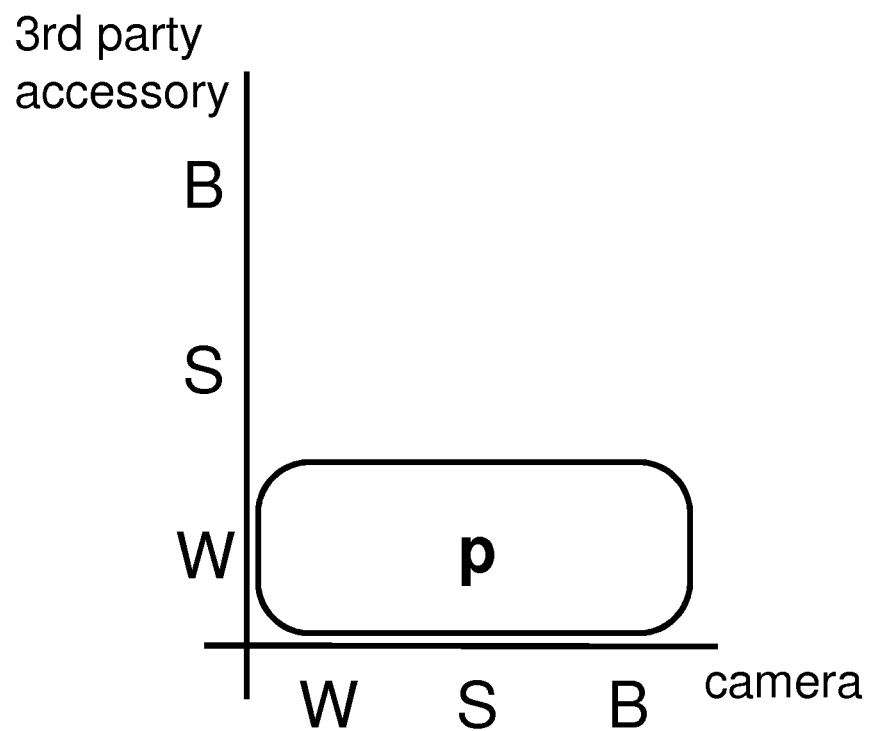
FIGS. 5a through 5q are diagrams illustrating the operation of the computer system of FIG. 1 on the example rule set of FIGS. 3a to 3e.

Rule p3 makes a pricing decision for cases of the scope of FIG. 3c that have a third-party accessory in white. This is indicated by the symbol p in FIG. 5a. As discussed above, it is also necessary to determine which decisions are not made for the cases of the scope of FIG. 3c. For this purpose, the decision detection modeller 131 builds the following constraint for detecting pricing decisions:
the bundle {ThirdPartyAccessory1, Adapter1} is priced at 500 for ShoppingCart1 if and only if the selected priority is at most 1, ThirdPartyAccessory1 is in the items of ShoppingCart1, Adapter1 is in the items of ShoppingCart1, and the colour of ThirdPartyAccessory1 is White Further, it builds the following constraint for detecting ghost pricing decisions:
the ghost pricing decision is not made for ShoppingCart1 and {ThirdPartyAccessory1, Adapter1}

The requirement violation modeller 133 builds the following decision definition constraint for the pricing decision:
the pricing decision is made for ShoppingCart1 and {ThirdPartyAccessory1, Adapter1} iff the bundle {ThirdPartyAccessory1, Adapter1} is priced at 500 for ShoppingCart1 or the ghost pricing decision is made for ShoppingCart1 and {ThirdPartyAccessory1, Adapter1}

Based on this, the missing decision detector 125 can conclude that the pricing decision is not made for cases having a third-party accessory in silver or black. This is indicated by ~p in FIG. 5b.

Further, the respective components of the missing decision detector 125 build the following constraints for detecting bundling decisions:
the bundling decision is not proposed for ShoppingCart1 and {ThirdPartyAccessory1, Adapter1}
the bundling decision is not forbidden for ShoppingCart1 and {ThirdPartyAccessory1, Adapter1}
the ghost bundling decision is not made for ShoppingCart1 and {ThirdPartyAccessory1, Adapter1}

Figure 5B:
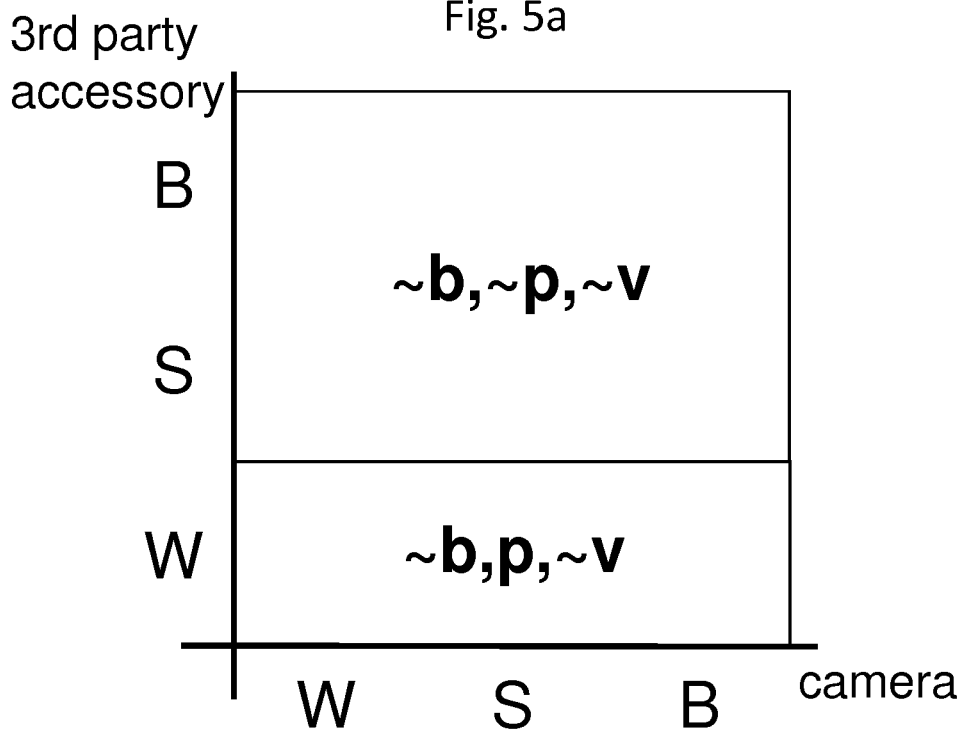

Combined with the following decision definition constraint, the missing decision detector 125 can conclude that the bundling decision is not made for any case of the scope of FIG. 3c, which is indicated by the symbol ~b in FIG. 5b:
the bundle decision is made for ShoppingCart1 and {ThirdPartyAccessory1, Adapter1} iff the bundle {ThirdPartyAccessory1, Adapter1} is proposed for ShoppingCart1 or the bundle {ThirdPartyAccessory1, Adapter1} is forbidden for ShoppingCart1 or the ghost bundle decision is made for ShoppingCart1 and {ThirdPartyAccessory1, Adapter1}

The missing decision detector 125 builds similar constraints for the voucher decision, meaning that the voucher decision is not made for any case of the scope of FIG. 3c, which is indicated by the symbol ~v in FIG. 5b.

The obligation modeller 132 builds the following obligation constraint for the scope of FIG. 3c:
one of the following conditions is true:
   the pricing decision is made for ShoppingCart1 and {ThirdPartyAccessory1, Adapter1}
   the bundling decision is made for ShoppingCart1 and {ThirdPartyAccessory1, Adapter1}
   the voucher decision is made for ShoppingCart1

Figure 5C:
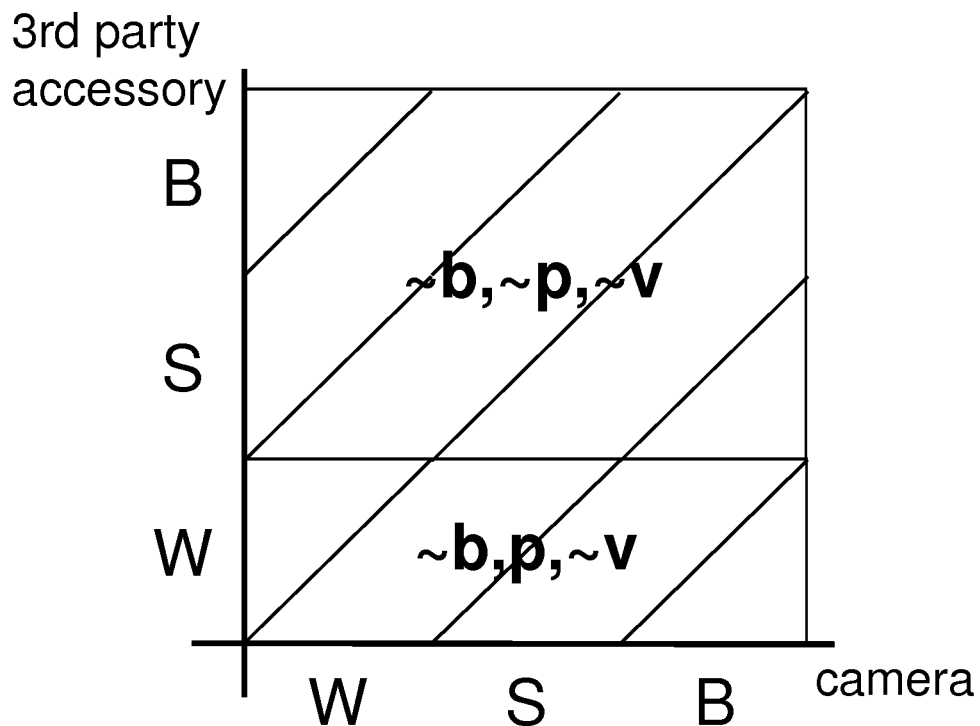

It is violated by cases having a third-party accessory in silver or black, as indicated by the cases being crossed out in FIG. 5c.

The requirement violation modeller 133 builds the following negated decision requirement constraint for the scope of FIG. 3c:
the bundle {ThirdPartyAccessory1, Adapter1} is proposed for ShoppingCart1 and the pricing decision is not made for ShoppingCart1 and {ThirdPartyAccessory1, Adapter1}

As a pricing decision is made for cases having a white third-party accessory, this constraint is not satisfied by those cases. Hence, they are also crossed out in FIG. 5c. Although these cases are lacking a bundling decision, they do not constitute cases with missing decisions as no bundle decision is required.

For the same reasons, the missing decision detector 125 is not able to find a labelling of the missing decision graph 138. It therefore reports that no case with missing decisions exists for the scope of FIG. 3c by returning a null object. The completion detector 129 thus detects that the scope of FIG. 3c is complete, meaning that this scope is added to the store of completed scopes 110.

In the second iteration, the scope selector 106 selects one of the five scopes that are not in the store of completed scopes 110. Hence, it will not choose scope of FIG. 3c again. The scope selector 106 may, for example, select a scope of smallest size among the non-completed scopes. This is of advantage since it guarantees that the generated ghost rules will have a minimal scope. However, the operation will be successful even if scopes are selected in an arbitrary order. In order to illustrate this, in the present example the scope selector 106 selects the scope of FIG. 3a in the second iteration. The rules extractor 121 selects the six rules, namely b1, b4, p1, p2, p4, v1, that match some or all of the four objects ShoppingCart1, Camera1, ProprietaryAccessory1, and ThirdPartyAccessory1 of the scope of FIG. 3a.

Figure 5D:
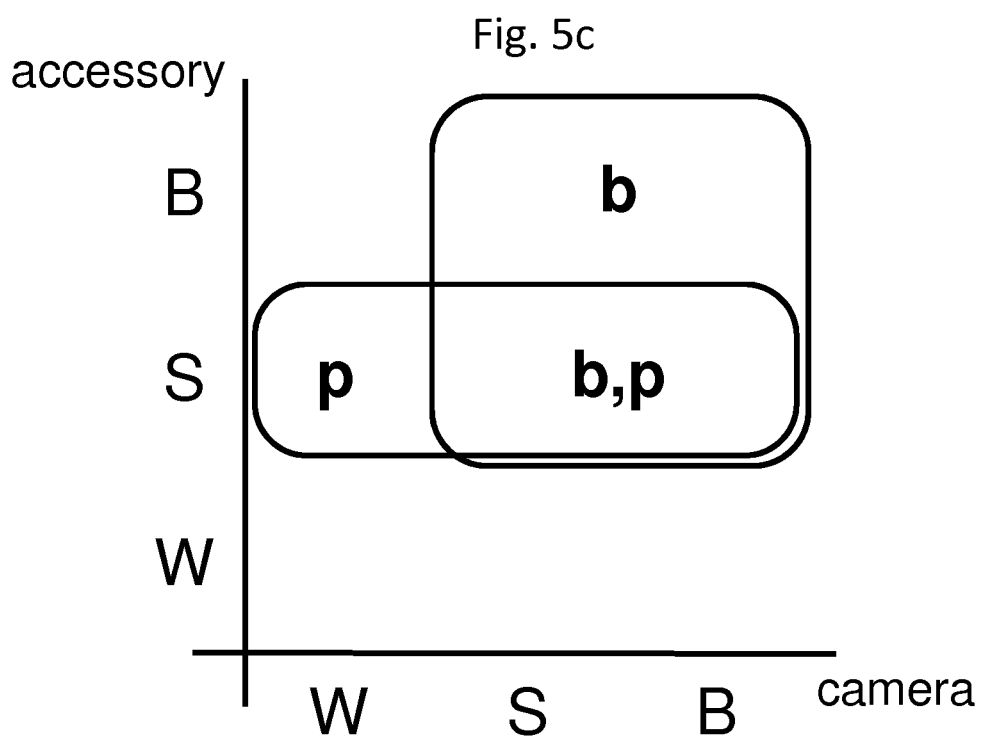
Figure 5E:
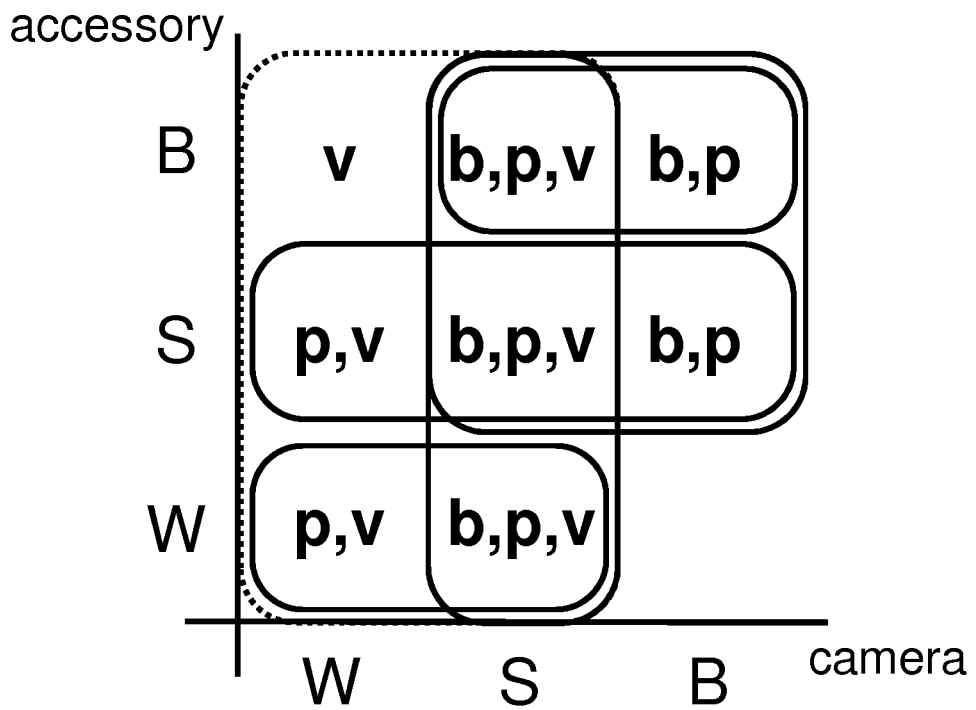

FIG. 5d shows the decisions made by rules b4 and p4 that match all objects of the given scope. If only those rules were taken into account, a missing decision would be obtained for cases with a black proprietary accessory and a camera that is not white. FIG. 5e shows the decisions made by all six selected rules. The decision detection modeller 131 builds the following constraints for detecting pricing decisions and ghost pricing decisions:
the bundle {Camera1, ProprietaryAccessory1} is priced at 500 for ShoppingCart1 if and only if one of the following conditions is true
  the selected priority is at most 1, Camera1 is in the items of ShoppingCart1, ProprietaryAccessory1 is in the items of ShoppingCart1, the colour of ProprietaryAccessory1 is White, and the colour of Camera1 is not Black
  the selected priority is at most 1, Camera1 is in the items of ShoppingCart1, ProprietaryAccessory1 is in the items of ShoppingCart1, the colour of Camera1 is not White, and the colour of ProprietaryAccessory1 is Black
the bundle {Camera1, ProprietaryAccessory1} is priced at 450 for ShoppingCart1 if and only if ThirdPartyAccessory1 is in the items of ShoppingCart1, the selected priority is at most 2, Camera1 is in the items of ShoppingCart1, ProprietaryAccessory1 is in the items of ShoppingCart1, the colour of ProprietaryAccessory1 is Silver
the ghost pricing decision is not made for ShoppingCart1 and {Camera1, ProprietaryAccessory1}

Further, it builds the decision definition constraint for the pricing decision:
the pricing decision is made for ShoppingCart1 and {Camera1, ProprietaryAccessory1} iff the bundle {Camera1, ProprietaryAccessory1} is priced at 500 for ShoppingCart1 or the bundle {Camera1, ProprietaryAccessory1} is priced at 450 for ShoppingCart1 or the ghost pricing decision is made for ShoppingCart1 and {Camera1, ProprietaryAccessory1}

Figure 5F:
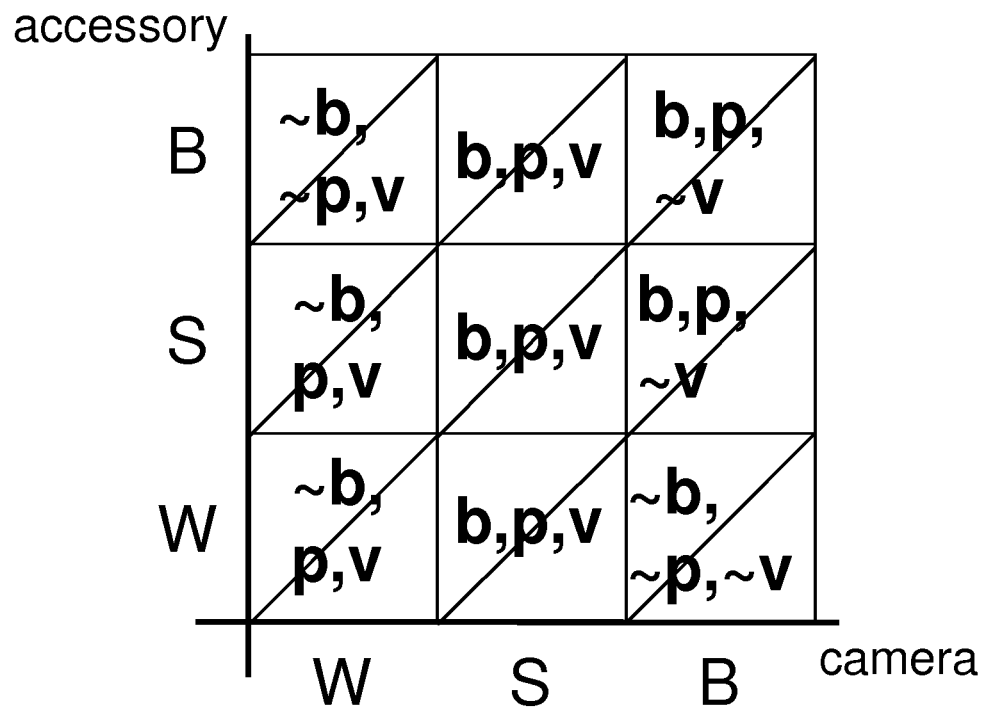

As a consequence, the missing decision detector 125 is able to detect that certain cases of the scope of FIG. 3a do not have a pricing decision, as illustrated in FIG. 5f.

The decision detection modeller 131 builds the constraints for detecting bundling decisions and ghost bundling decisions:
the bundling decision is proposed for ShoppingCart1 and {Camera1, ProprietaryAccessory1} if and only if one of the following conditions is true
  the selected priority is at most 1, Camera1 is in the items of ShoppingCart1, ProprietaryAccessory1 is in the items of ShoppingCart1, and the colour of Camera1 is Silver
  third party accessory ThirdPartyAccessory1 is in the items of ShoppingCart1, the selected priority is at most 2, Camera1 is in the items of ShoppingCart1, ProprietaryAccessory1 is in the items of ShoppingCart1, the colour of Camera1 is not White, and the colour of ProprietaryAccessory1 is not White
the bundling decision is not forbidden for ShoppingCart1 and {Camera1, ShoppingCart1}
the ghost bundling decision is not made for ShoppingCart1 and {Camera1, ProprietaryAccessory1}
It also builds a decision definition constraint for the bundling decision. Based on this, the missing decision detector 125 detects that the bundle decision is not made for the cases indicated in FIG. 5f:

the bundle decision is made for ShoppingCart1 and {Camera1, ProprietaryAccessory1} iff the bundle {Camera1, ProprietaryAccessory1} is proposed for ShoppingCart1 or the bundle {Camera1, ProprietaryAccessory1} is forbidden for ShoppingCart1 or the ghost bundle decision is made for ShoppingCart1 and {Camera1, ProprietaryAccessory1}

The missing decision detector 125 also builds a negated decision requirement constraint:
the bundle {Camera1, ProprietaryAccessory1} is proposed for ShoppingCart1 and the pricing decision is not made for ShoppingCart1 and {Camera1, ProprietaryAccessory1}

However, this constraint is violated by each case of the scope of FIG. 3a since there is no case for which a bundle is proposed, but no pricing decision is made. Therefore, all cases are crossed out in FIG. 5f. For the same reasons, the missing decision detector 125 is not able to find a labelling of the missing decision graph 138. It reports that no case with missing decisions exists for the scope of FIG. 3a, and so it is added to the store of completed scopes 110.

In the third iteration, the scope selector 106 may select any of the three unexplored scopes, and in this example selects the scope of FIG. 3b. The rules extractor 121 selects the four rules, namely b1, p1, p2, v1, that match the four three objects ShoppingCart1, Camera1, and ProprietaryAccessory1 of the scope of FIG. 3b.

Figure 5G:
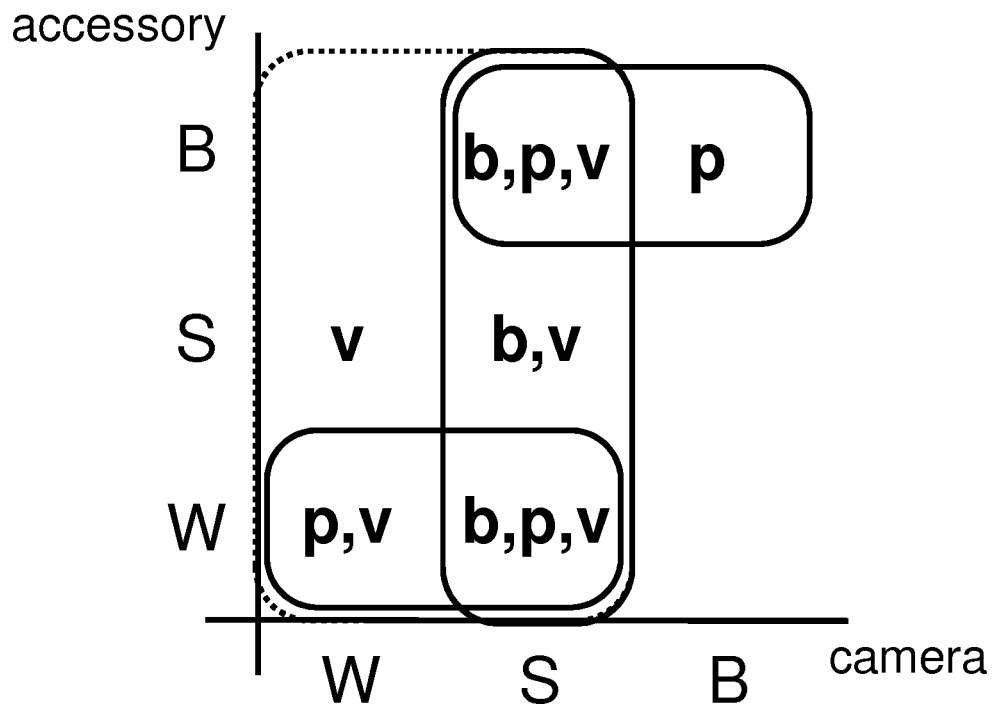

FIG. 5g shows the decisions that are made by the rules for cases of the scope of FIG. 3b. The decision detection modeller 131 builds the following constraints for detecting a voucher decision and a ghost voucher decision:
a voucher is offered for ShoppingCart1 if and only if the selected priority is at most 1, Camera1 is in the items of ShoppingCart1, ProprietaryAccessory1 is in the items of ShoppingCart1, and the colour of Camera1 is not Black
a voucher is not denied for ShoppingCart1
the ghost voucher decision is not made for ShoppingCart1

It builds the following decision definition constraint for the voucher decision:
the voucher decision is made for ShoppingCart1 iff a voucher is offered for ShoppingCart1 or a voucher is denied for ShoppingCart1 or a ghost voucher decision is made for ShoppingCart1

Figure 5H:
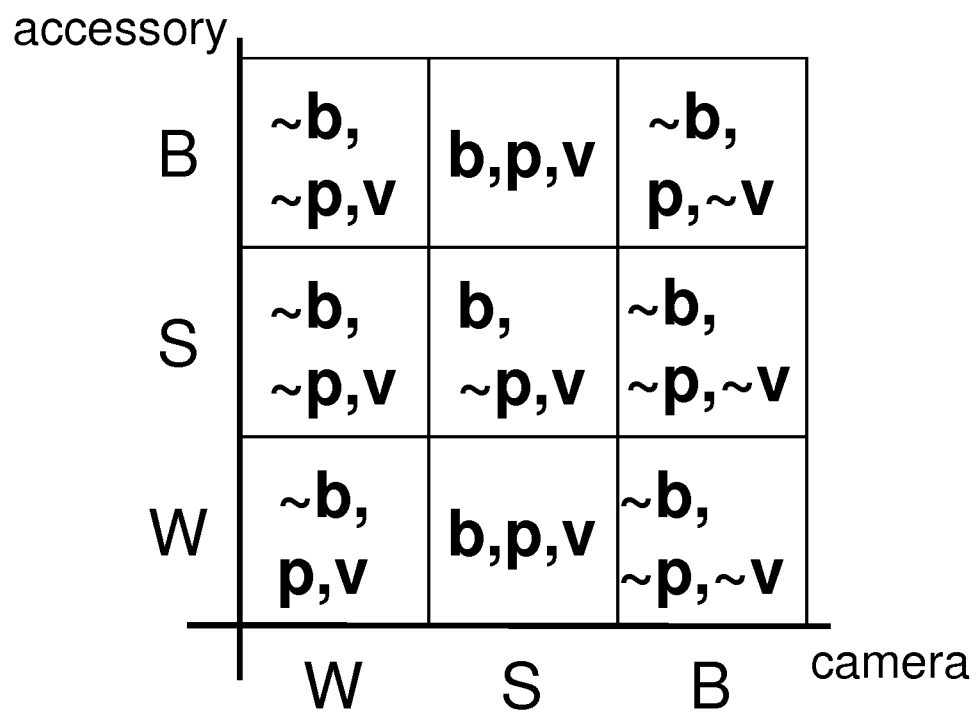

The missing decision detector 125 is thus able to determine for which cases the voucher decision is made and for which cases it is not made. FIG. 5h indicates those cases by v and ~v.

Further, the decision detection modeller 131 builds the following constraints for detecting bundle decisions:
the bundling decision is proposed for ShoppingCart1 and {Camera1, ProprietaryAccessory1} if and only if the selected priority is at most 1, Camera1 is in the items of ShoppingCart1, ProprietaryAccessory1 is in the items of ShoppingCart1, and the colour of Camera1 is Silver
the bundling decision is not forbidden for ShoppingCart1 and {Camera1, ShoppingCart1}
the ghost bundling decision is not made for ShoppingCart1 and {Camera1, ProprietaryAccessory1}

It builds the same decision definition constraint for bundle decisions as for the scope of FIG. 3a. FIG. 5h shows the cases for which a bundle decision is made as well as the cases for which it is not made.

Finally, the decision detection modeller 131 builds the following constraint for detecting a pricing decision:
the bundle {Camera1, ProprietaryAccessory1} is priced at 500 for ShoppingCart1 if and only if one of the following conditions is true
  the selected priority is at most 1, Camera1 is in the items of ShoppingCart1, ProprietaryAccessory1 is in the items of ShoppingCart1, the colour of ProprietaryAccessory1 is White, and the colour of Camera1 is not Black the selected priority is at most 1, Camera1 is in the items of ShoppingCart1, ProprietaryAccessory1 is in the items of ShoppingCart1, the colour of Camera1 is not White, and the colour of ProprietaryAccessory1 is Black The decision detection modeller 131 builds the following decision definition constraint for pricing decisions:
the pricing decision is made for ShoppingCart1 and {Camera1, ProprietaryAccessory1} iff the bundle {Camera1, ProprietaryAccessory1} is priced at 500 for ShoppingCart1 or the ghost pricing decision is made for ShoppingCart1 and {Camera1, ProprietaryAccessory1}

FIG. 5h shows the cases for which a pricing decision is made as well as the cases for which it is not made.

There is a single case for which a bundle is proposed, but no pricing decision is made, namely when camera and proprietary accessory are both in silver. This case satisfies the negated decision requirement constraint that the decision detection modeller 131 has built as well:
the bundle {Camera1, ProprietaryAccessory1} is proposed for ShoppingCart1 and the pricing decision is not made for ShoppingCart1 and {Camera1, ProprietaryAccessory1}

Figures 5I, 5J:
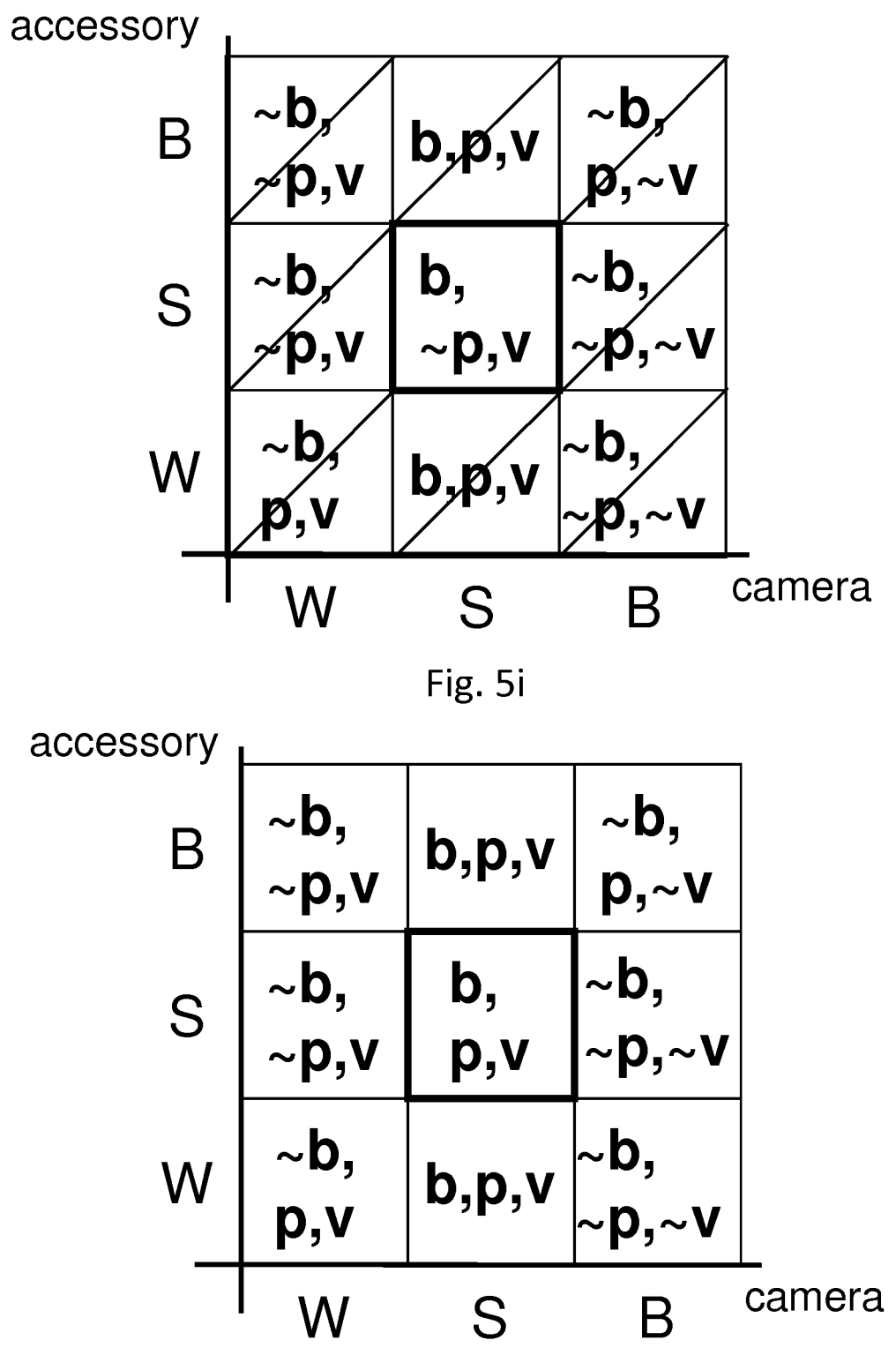

All other cases violate this constraint and are crossed out in FIG. 5i.

Figure 5K:
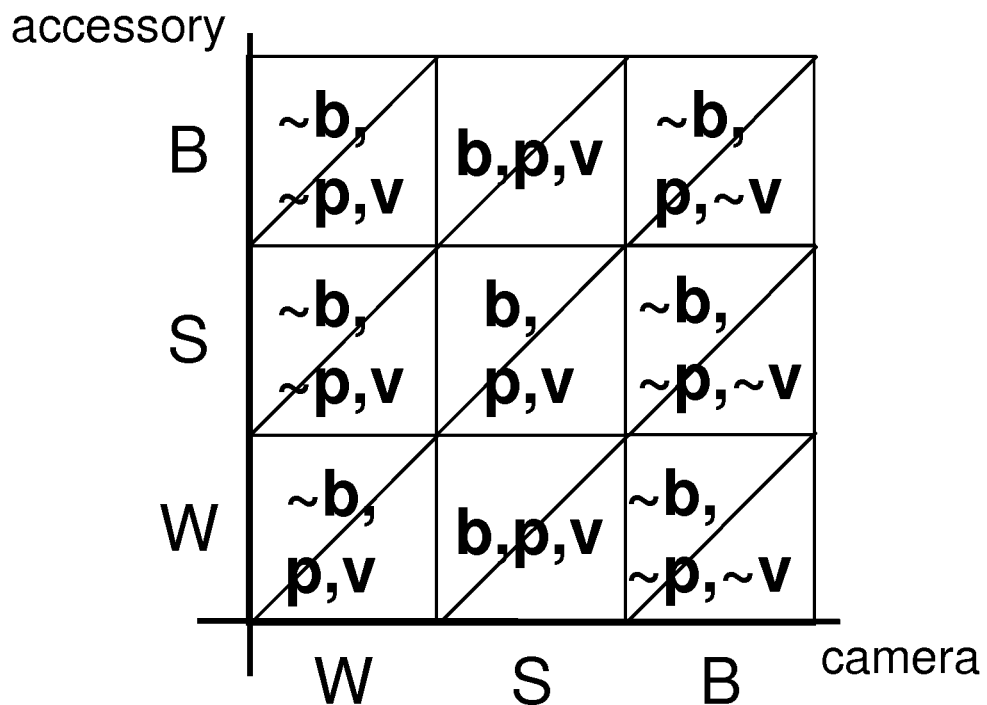

The missing detection detector 125 will thus be able to detect a case with missing decisions 126 and pass a labelling of the missing decision graph 138 to the ghost rule builder 166. The ghost rule builder 166 may produce the following ghost rule of priority 2 as there is a rule or priority 2, namely b1, that can be applied to the considered case:
definitions
  set 'SC1' to a shopping cart;
  set 'Camera1' to a camera in the items of SC1;
  set 'Accessory1' to a proprietary accessory in the items of SC1;
if the colour of Camera1 is "Silver" and the colour of Accessory1 is "Silver"
then the bundle {Camera1, Accessory1} is priced at <price> for SC1;

The ghost rule builder 166 adds this ghost rule 124 to the ghost rule store 111. The missing decision detector 125 then seeks a new case with missing decisions for the scope of FIG. 3b. It builds a new constraint for detecting a ghost pricing decision:
the ghost pricing decision is made for ShoppingCart1 and {Camera1, ProprietaryAccessory1} if and only if the selected priority is at most 2, Camera1 is in the items of ShoppingCart1, ProprietaryAccessory1 is in the items of ShoppingCart1, the colour of Camera1 is Silver, and the colour of ProprietaryAccessory1 is Silver This modifies the cases for which a pricing decision is made. FIG. 5j shows the decisions that are made and not made for cases of the scope of FIG. 3b after the modification of the ghost pricing detection constraint. As there no longer is any case for which a bundle is proposed, but no pricing decision is made, all cases of the scope of FIG. 3b are crossed out in FIG. 5k. For the same reasons, the missing decision detector 125 is no longer able to find a labelling of the modified missing decision graph. It therefore reports that no case with missing decisions exists for the scope of FIG. 3b, which is added to the store of completed scopes 110.

Figure 5L:
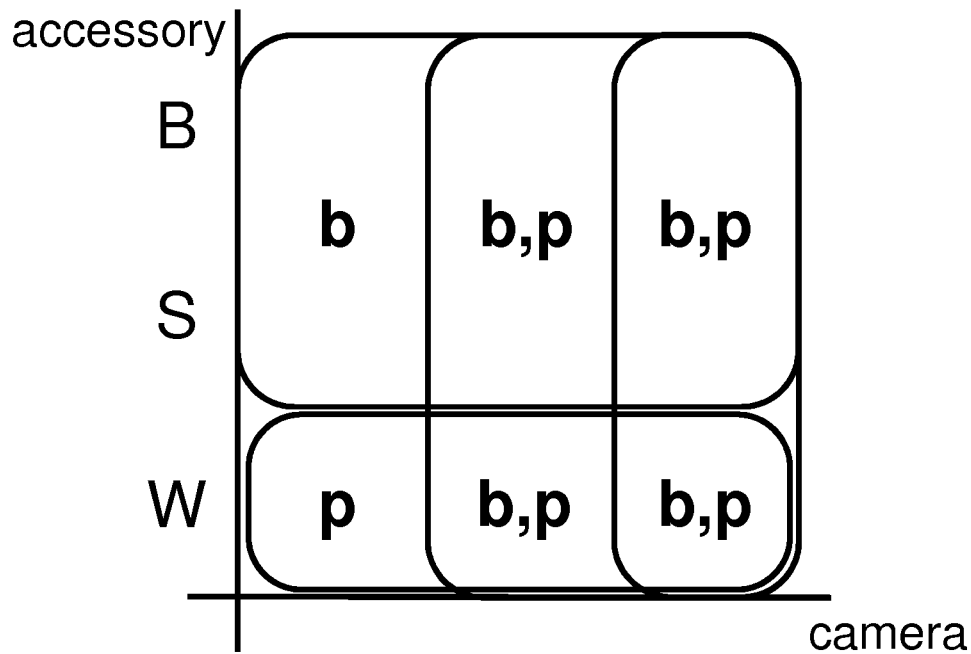

In the fourth iteration, all scopes except two have been explored. In the present example, the scope selector 106 selects the scope of FIG. 3e. The rules extractor 121 selects all ten rules, as they match some or all of the five objects ShoppingCart1, Camera1, and ProprietaryAccessory1, ThirdPartyAccessory1, and Adapter1 of the scope of FIG. 3e. FIG. 5l shows the decisions made by these rules for cases characterised by the colour of the camera and the colour of the third-party accessory. Other dimensions such as the colour of the proprietary accessory do not impact these decisions and therefore are not shown in this figure.

The missing decision detector 125 builds constraints for detecting decisions for bundling and pricing the camera and the proprietary accessory as well as for bundling and pricing the third-party accessory and the adapter. It may happen that a scope is complete for one bundle, but have missing decisions for another. With respect to the first bundle, the decision detection modeller 131 builds the same constraints for detecting and defining pricing decision as for the scope of FIG. 3b. As this scope is complete for pricing a bundle consisting of a camera and a proprietary accessory, the scope of FIG. 3e is complete for this bundle as well. The discussion will therefore focus on the bundling and pricing of the second bundle.

The decision detection modeller 131 builds the following constraints for detecting pricing decision constraints for the bundle consisting of a third-party accessory and an adapter:
the bundle {ThirdPartyAccessory1, Adapter1} is priced at 500 for ShoppingCart1 if and only if the selected priority is at most 1, ThirdPartyAccessory1 is in the items of ShoppingCart1, Adapter1 is in the items of ShoppingCart1, and the colour of ThirdPartyAccessory1 is White
the bundle {ThirdPartyAccessory1, Adapter1} is priced at 400 for ShoppingCart1 if and only if Camera1 is in the items of ShoppingCart1, the selected priority is at most 2, ThirdPartyAccessory1 is in the items of ShoppingCart1, Adapter1 is in the items of ShoppingCart1, and the colour of Camera1 is not White
the ghost pricing decision is not made for ShoppingCart1 and {ThirdPartyAccessory1, Adapter1}

Further, the decision detection modeller 131 builds the decision definition constraint for pricing the second bundle:
the pricing decision is made for ShoppingCart1 and {ThirdPartyAccessory1, Adapter1} iff the bundle {ThirdPartyAccessory1, Adapter1} is priced at 500 for ShoppingCart1 or the bundle {ThirdPartyAccessory1, Adapter1} is priced at 400 for ShoppingCart1 or the ghost pricing decision is made for ShoppingCart1 and {ThirdPartyAccessory1, Adapter1}

Figure 5M:
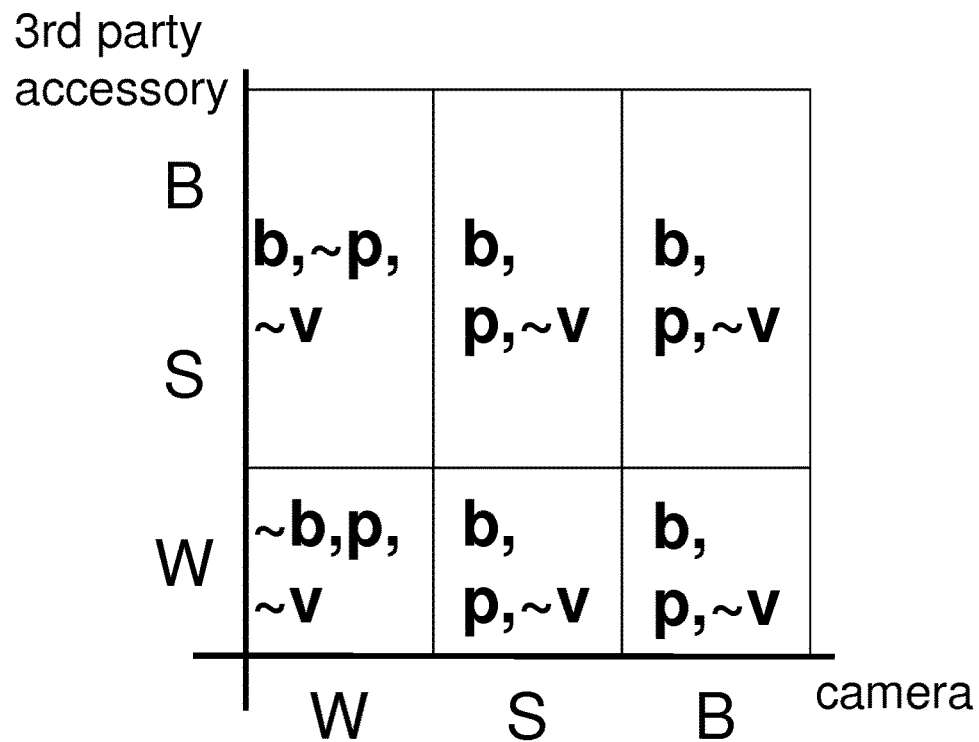

FIG. 5m shows the cases for which a pricing decision is made as well as the cases for which no pricing decision is made.

The decision detection modeller 131 builds the following constraints for detecting the decision of bundling a third-party accessory and an adapter:
the bundling decision is proposed for ShoppingCart1 and {ThirdPartyAccessory1, Adapter1} if and only if one of the following conditions is true
  Camera1 is in the items of ShoppingCart1, the selected priority is at most 2, ThirdPartyAccessory1 is in the items of ShoppingCart1, Adapter1 is in the items of ShoppingCart1, and the colour of ThirdPartyAccessory1 is not White
  Camera1 is in the items of ShoppingCart1, the selected priority is at most 2, ThirdPartyAccessory1 is in the items of ShoppingCart1, Adapter1 is in the items of ShoppingCart1 and the colour of Camera1 is not White
the bundling decision is forbidden for ShoppingCart1 and {ThirdPartyAccessory1, Adapter1} if and only if Camera1 is in the items of ShoppingCart1, ProprietaryAccessory1 is in the items of ShoppingCart1, the selected priority is at most 3, ThirdPartyAccessory1 is in the items of ShoppingCart1, Adapter1 is in the items of ShoppingCart1, and the colour of Camera1 is Black the ghost bundling decision is not made for ShoppingCart1 and {ThirdPartyAccessory1, Adapter1}

Further, it builds the decision definition constraint for bundling the second bundle:

the bundle decision is made for ShoppingCart1 and {ThirdPartyAccessory1, Adapter1} iff the bundle {ThirdPartyAccessory1, Adapter1} is proposed for ShoppingCart1 or the bundle {ThirdPartyAccessory1, Adapter1} is forbidden for ShoppingCart1 or the ghost bundle decision is made for ShoppingCart1 and {ThirdPartyAccessory1, Adapter1}

FIG. 5m shows the cases for which a bundling decision is made as well as the cases for which no bundling decision is made. If the camera is white and the third-party accessory is silver or black, then a bundle is proposed for these two items, but no pricing decision is made. Those cases thus satisfy the negated decision requirement constraint for this bundle:

the bundle {ThirdPartyAccessory1, Adapter1} is proposed for ShoppingCart1 and the pricing decision is not made for ShoppingCart1 and {ThirdPartyAccessory1, Adapter1}

Figure 5N:
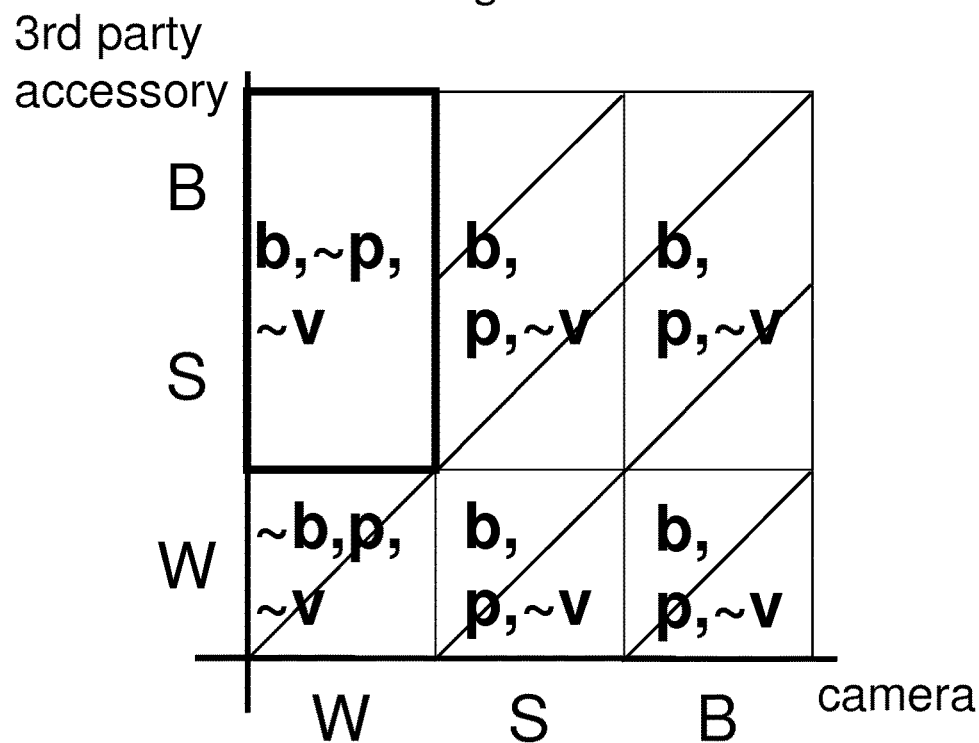

All other cases violate this constraint, and are crossed out in FIG. 5n.

The missing decision detector 125 will be able to identify one of the cases that satisfy the negated requirement constraint. It will thus pass a labelling to the ghost rule builder 166 who may generate the following ghost rule of priority 2:

definitions
set 'SC1' to a shopping cart;
set 'Camera1' to a camera in the items of SC1;
set 'Adapter1' to an adapter in the items of SC1;
set 'Accessory1' to a proprietary accessory in the items of SC1;
set 'Accessory2' to a third party accessory in the items of SC1;
if the colour of Camera1 is "Silver" and the colour of Accessory2 is not "White"
then the bundle {Adapter1, Accessory2} is priced at <price> for SC1;

This ghost rule may be added to the ghost rule store 111, thus completing the scope of FIG. 3e. As this ghost rule matches five objects, it is not applicable to the scope of FIG. 3d, which consists only of four objects and which still needs to be explored.

Figure 5O:
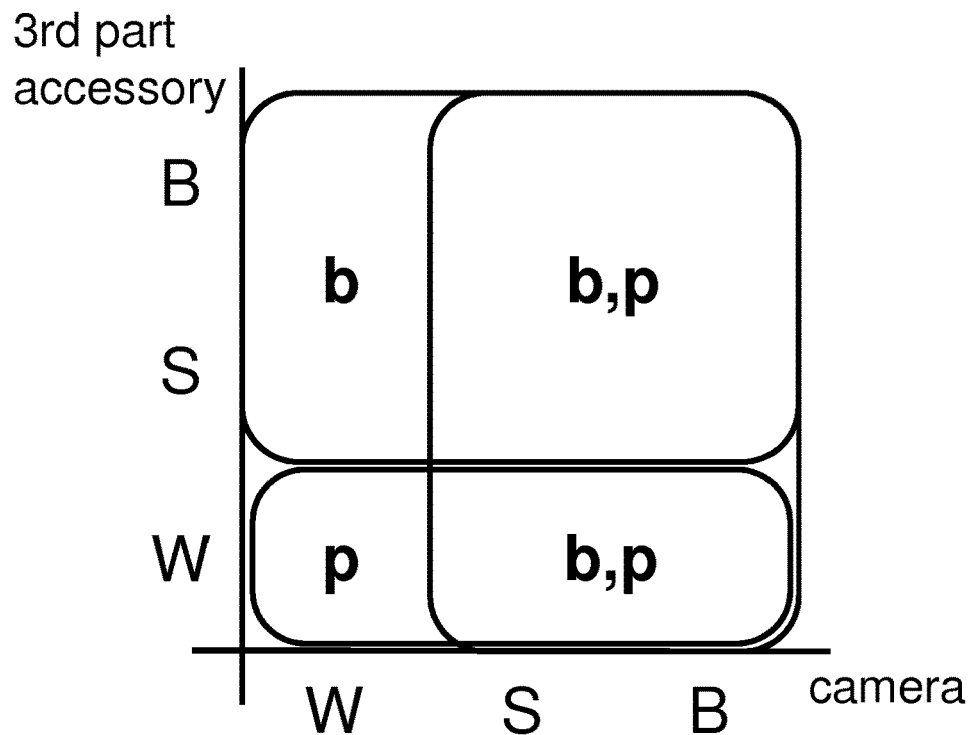

In the fifth iteration, the scope selector 106 necessarily selects the remaining non-completed scope, the scope of FIG. 3d. The rules extractor 121 selects the four rules b2, p3, r1 as they match some or all of the four objects ShoppingCart1, Camera1, ThirdPartyAccessory1 and Adapter1 of the scope of FIG. 3d. FIG. 5o shows the decisions made by those rules.

The missing decision detector 125 builds the following constraints for detecting the decision of bundling a third-party accessory and an adapter:

the bundling decision is proposed for ShoppingCart1 and {ThirdPartyAccessory1, Adapter1} if and only if one of the following conditions is true Camera1 is in the items of ShoppingCart1, the selected priority is at most 2, ThirdPartyAccessory1 is in the items of ShoppingCart1, Adapter1 is in the items of ShoppingCart1, and the colour of ThirdPartyAccessory1 is not White Camera1 is in the items of ShoppingCart1, the selected priority is at most 2, ThirdPartyAccessory1 is in the items of ShoppingCart1, Adapter1 is in the items of ShoppingCart1 and the colour of Camera1 is not White the bundling decision is not forbidden for ShoppingCart1 and {ThirdPartyAccessory1, Adapter1} the ghost bundling decision is not made for ShoppingCart1 and {ThirdPartyAccessory1, Adapter1}

Figure 5P:
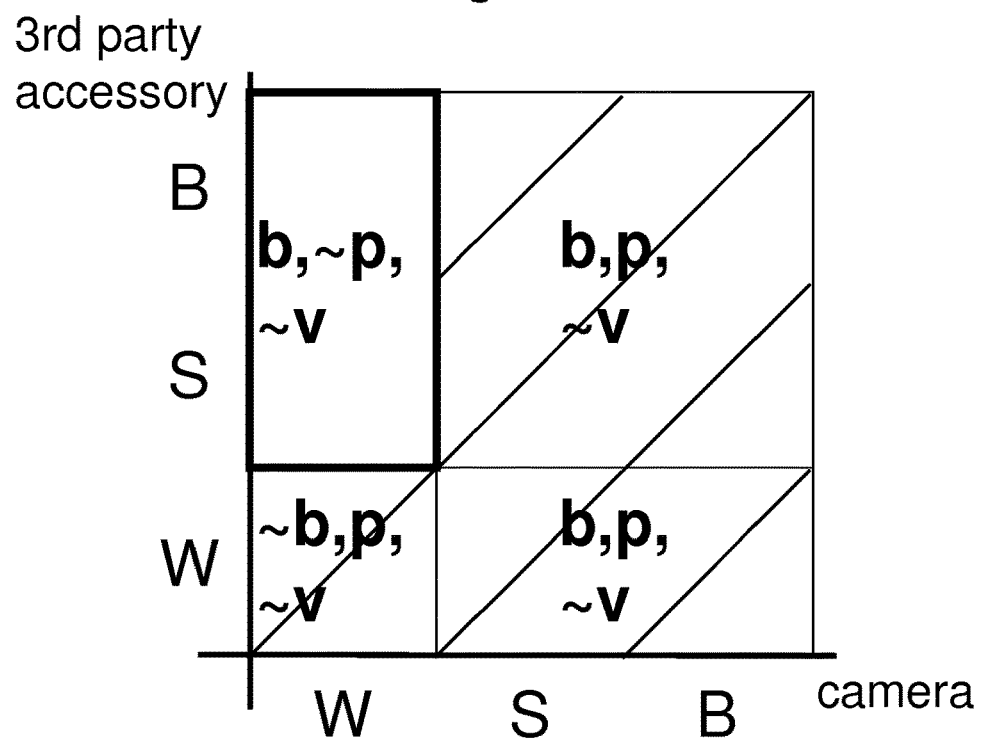

Further, it builds the same decision definition constraint for bundling a third-party accessory and an adapter as for the scope of FIG. 3e. FIG. 5p shows the cases for which the bundle decision is made and the cases for which it is not made.

The missing decision detector 125 builds the same constraints for detecting the pricing of a third-party accessory and an adapter as for the scope of FIG. 3e. Further, it builds the same decision definition constraint for pricing this bundle as for the scope of FIG. 3e. Based on these constraints, FIG. 5p shows the cases for which the pricing decision is made and the cases for which it is not made. As for the scope of FIG. 3e, cases consisting of a white camera and a third-party accessory in silver or black are subject may receive a bundle consisting of a third-party accessory and an adapter, although this bundle is not priced. Hence, these cases satisfy the negated decision requirement constraint:

the bundle {ThirdPartyAccessory1, Adapter1} is proposed for ShoppingCart1 and the pricing decision is not made for ShoppingCart1 and {ThirdPartyAccessory1, Adapter1}

Figure 5Q:
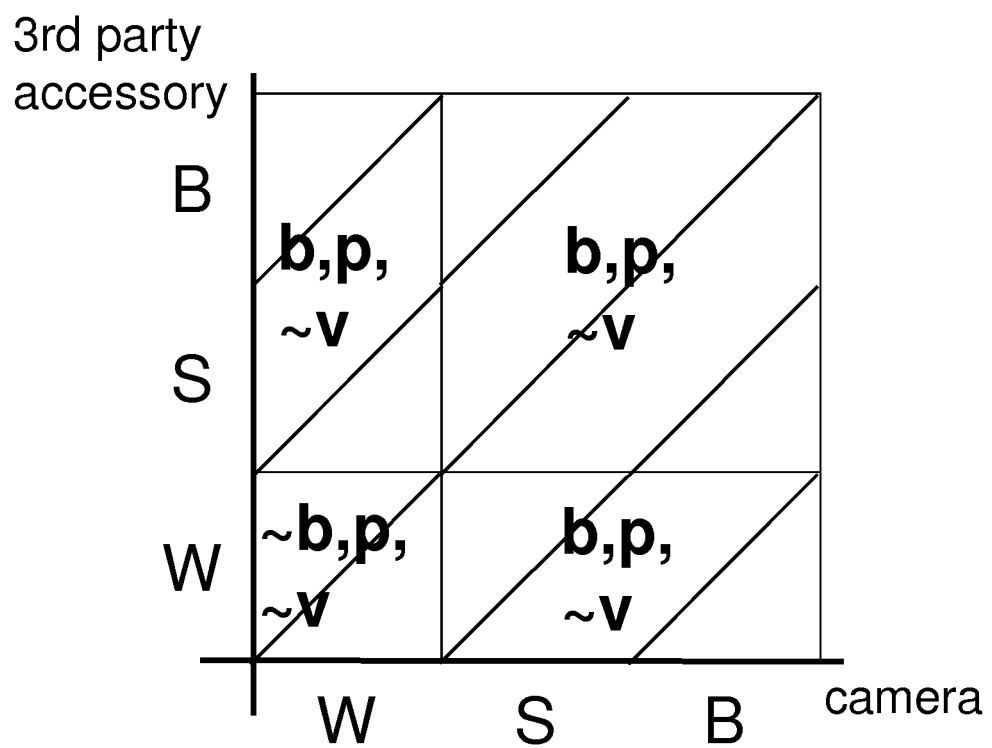

All other cases violate this constraint, and so are crossed out in FIG. 5q.

The missing decision detector 125 will again be able to identify a case with missing decisions and pass it to the ghost rule builder 166. The ghost rule builder 166 may generate the following ghost rule of priority 2:

definitions
set 'SC1' to a shopping cart;
set 'Camera1' to a camera in the items of SC1;
set 'Adapter1' to an adapter in the items of SC1;
set 'Accessory2' to a third party accessory in the items of SC1;
if the colour of Camera1 is "Silver" and the colour of Accessory2 is not "White"
then the bundle {Adapter1, Accessory2} is priced at <price> for SC1;

This ghost rule is similar to the ghost rule found for the scope of FIG. 3e, but does not match a proprietary accessory. As a consequence, it matches all objects of the scope of FIG. 3d. Not only this does new ghost rule complete the missing decision in the scope of FIG. 3d, but also the missing decision in the scope of FIG. 3e. Thus, it can be seen that if the scope of FIG. 3d had been completed before the scope of FIG. 3e, no ghost rule would be generated for the scope of FIG. 3e. Selecting smaller scopes before larger scopes thus has the advantage that fewer ghost rules are generated. Further, the generated ghost rules match fewer objects and are therefore more general.

After generating the ghost rule for the scope of FIG. 3d, the missing decision detector 125 does not find any further cases with missing decisions for the scope of FIG. 3d. Therefore, the scope of FIG. 3d is added to the store of completed scopes 110. As all scopes are now included in the store of completed scopes 110, the scope selector 106 will not select any further scope. The process of generating ghost rules to supply missing decisions is therefore finished.

As the resulting ghost rules contain placeholders in their action parts, they cannot be incorporated as such in the rule set 101. A domain expert or external analytical module can be used to choose one of the alternative actions of the missing decisions depending on the cases treated by the ghost rules. The placeholders will then be filled by the chosen actions, and the ghost rules will be transformed into additional ordinary rules.

Figure 4F:
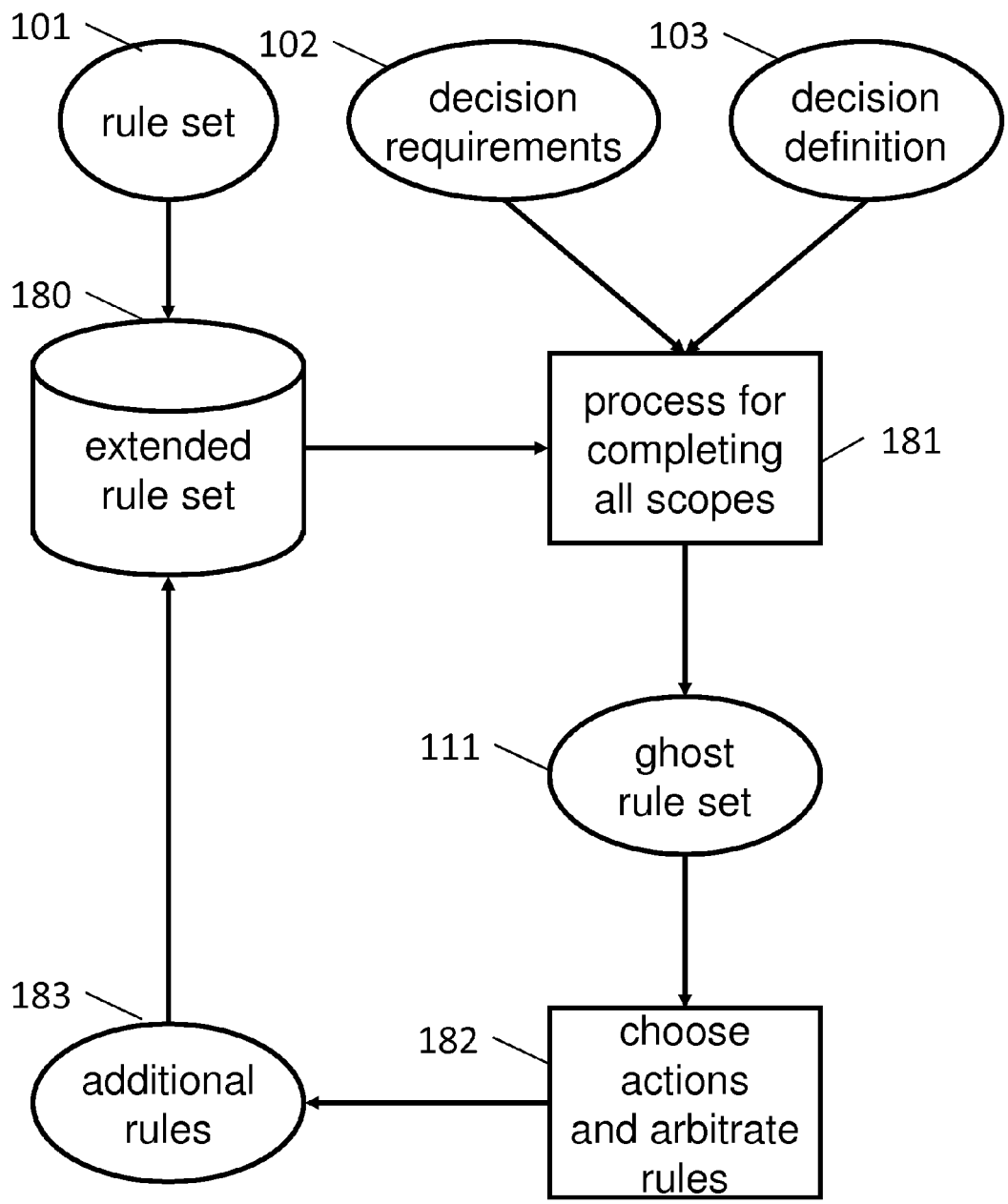
FIG. 4f is a data-flow chart showing the operation of the computer system of FIG. 1 when combining generated rules with an original rule set

The resulting set of additional rules may be combined with the original rule set 101 into an extended rule set, as now described with reference to the data-flow chart of FIG. 4f. As described above, the set of additional rules 183 is generated from the ghost rule set 111 by choosing actions (and arbitrating between conflicting rules if necessary) 182. The set of additional rules 183 is added to the rule set 101 to give the extended rule set 180. The extended rule set 180 may apply actions that have not been applied by the original rule set 101. As such, decision requirements 102 that are formulated over these actions may be violated by the extended rule set 180 even if they have been satisfied by the original rule set 101. It is thus necessary to seek additional cases with missing decisions in this extended rule set 180. The process for completing all scopes 181 described above will therefore be applied again, but this time to the extended rule set 180. If this produces new ghost rules in the ghost rule store 111, the whole process of choosing actions for the ghost rules, extending the rule set, and seeking cases with missing decisions is iterated. As the set of atomic decisions that are made by the rules for the cases is finite, the process will eventually terminate and return an extended rule 180 set that does not have any case with a missing decision.

While the present invention has been described and illustrated with reference to particular embodiments, it will be appreciated by those of ordinary skill in the art that the invention lends itself to many different variations not specifically illustrated herein.

For example, it will be appreciated that the various sets of data that the computer system 1 receives could be in received in different orders, and similarly the various graphs and the like could be generated in different orders, as long as in each case the required data was available.

It will also be appreciated that while an example is given for decisions made for a web shopping system, the invention is equally applicable to many other types of system. To give just one alternative example, the invention could be applied to a computer security system, in which a set of rules made decisions about the security of a system, and one or more decision requirements related to aspects of the security of the system. The set of rules could include rules deciding when different combinations of security features of computing devices of a computer system (e.g. firewalls, anti-virus applications, and the like) provided different levels of security, and one or more decision requirements could require different levels of security for computing devices with different levels of privileges.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of identifying a case with a missing decision from a set of decision rules in violation of a decision requirement, wherein the decision rules determine whether a decision is made for a case, and wherein the decision requirement determines the decisions required for a case, the method comprising:
receiving the set of decision rules;
receiving the decision requirement;
obtaining a set of decisions made by the decision rules;
building a decision detection constraint graph that represents, for each case used by the set of decision rules, whether each decision in the set of decisions is made or not for the case by a decision rule in the set of decision rules;
building a decision requirement constraint graph from the decision requirement, that represents for each case used by the set of decision rules the decisions required for that case; and
for each case used by the set of decision rules, using the decision requirement constraint graph and the decision detection constraint graph for the case to identify if the case is a case with a missing decision.

2. A computer-implemented method as claimed in claim 1, wherein the set of decisions is generated from the decision rules.

3. A computer-implemented method as claimed in claim 1, wherein a set of cases is generated from the decision rules.

4. A computer-implemented method as claimed in claim 3, further comprising generating a new set of cases used by the set of decision rules, and using the new set of cases to determine further cases with missing decisions.

5. A computer-implemented method as claimed in claim 4, wherein the method is repeated for each possible set of cases used by the set of decision rules.

6. A computer-implemented method as claimed in claim 1, further comprising generating a ghost decision rule that determines that a decision is made for the identified case with a missing decision.

7. A computer-implemented method as claimed in claim 6, wherein the method is repeated with the ghost decision rule added to the set of decision rules.

8. A computer-implemented method as claimed in claim 7, wherein the method is repeated until no further cases with missing decisions are identified.

9. A computer system for identifying a case with a missing decision from a set of decision rules in violation of a decision requirement, wherein the decision rules determine whether a decision is made for a case, wherein the computer system comprises memory and a processor system and is arranged to:
receive the set of decision rules and store it in the memory;
receive the decision requirement and store it in the memory;
obtain a set of decisions made by the decision rules and store it in the memory;
use the processor system to build a decision detection constraint graph that represents, for each case used by the set of decision rules, whether each decision in the set of decisions is made or not by a decision rule in the set of decision rules;
use the processor system to build a decision requirement constraint graph from the decision requirement that represents, for each case used by the set of decision rules, the decisions required; and
for each case used by the set of decision rules, using the decision requirement constraint graph and the decision detection constraint graph for the case to identify if the case is a case with a missing decision.

10. A computer system as claimed in claim 9, arranged to generate the set of decisions from the decision rules.

11. A computer system as claimed in claim 9, arranged to generate a set of cases from the decision rules.

12. A computer system as claimed in claim 11, further arranged to generate a new set of cases used by the set of decision rules, and use the new set of cases to determine further cases with missing decisions.

13. A computer system as claimed in claim 12, arranged to determine further cases with missing decisions for each possible set of cases used by the set of decision rules.

14. A computer system as claimed in claim 9, further arranged to generate a ghost decision rule that determines that a decision is made for the identified case with a missing decision.

15. A computer system as claimed in claim 14, further arranged to add the ghost decision rule to the set of decision rules, and use the new set of decision rules to determine further cases with missing decisions.

16. A computer system as claimed in claim 15, arranged to generate new ghost decision rules until no further cases with missing decisions are identified.

17. A computer program product for identifying a case with a missing decision from a set of decision rules in violation of a decision requirement, wherein the decision rules determine whether a decision is made for a case, and wherein the decision requirement determines the decisions required for a case, the computer program product comprising a computer-readable storage medium having computer-readable program code embodied therewith, the computer-readable program code configured to perform the steps of:
- receiving the set of decision rules;
- receiving the decision requirement;
- obtaining a set of decisions made by the decision rules;
- building a decision detection constraint graph that represents, for each case used by the set of decision rules, whether each decision in the set of decisions is made or not by a decision rule in the set of decision rules;
- building a decision requirement constraint graph from the decision requirement, that represents, for each case used by the set of decision rules, the decisions required; and
- for each case used by the set of decision rules, using the decision requirement constraint graph and the decision detection constraint graph for the case to identify if the case is a case with a missing decision.

* * * * *